US00RE37845E

(19) United States
(12) Reissued Patent
Kamada et al.

(10) Patent Number: US RE37,845 E
(45) Date of Reissued Patent: Sep. 17, 2002

(54) THERMAL RECORDING APPARATUS USING RECORDING SHEET MADE OF THERMAL REVERSIBLE MATERIAL

(75) Inventors: Takeshi Kamada, Atsugi (JP); Toshiaki Kumashiro, Ebina (JP)

(73) Assignee: Ricoh Company, Ltd., Tokyo (JP)

(21) Appl. No.: 09/448,976

(22) Filed: Nov. 24, 1999

Related U.S. Patent Documents

Reissue of:
(64) Patent No.: 5,691,758
Issued: Nov. 25, 1997
Appl. No.: 08/348,906
Filed: Nov. 25, 1994

U.S. Applications:

(63) Continuation of application No. 07/873,152, filed on Apr. 24, 1992, now abandoned.

(30) Foreign Application Priority Data

Apr. 25, 1991 (JP) ..... 3-094641

(51) Int. Cl.[7] ..... B41J 2/36; B41J 2/365
(52) U.S. Cl. ..... 347/141; 347/194
(58) Field of Search ..... 347/171, 194, 347/217; 346/135.1; 358/296, 298, 501, 503; 400/120.01, 120.14

(56) References Cited

U.S. PATENT DOCUMENTS 4,839,731 A * 6/1989 Saka ..... 358/296
4,851,924 A * 7/1989 Nakamura et al. ..... 358/296
4,965,591 A * 10/1990 Kurabayashi et al. .... 346/135.1

FOREIGN PATENT DOCUMENTS

JP 58-27464 * 2/1983
JP 61-58763 * 3/1986

OTHER PUBLICATIONS

Society of Electrophotography of Japan, May 16–18, 1988, Tokyo; Proceeding of 4th Japanese Symposium On Non–Impact Printing Technologies Symposium; Thermal Reversible Material and Recording, May 1988.*

* cited by examiner

*Primary Examiner*—Huan Tran
(74) *Attorney, Agent, or Firm*—Oblon, Spivak, McClelland, Maier & Neustadt, P.C.

(57) ABSTRACT

A thermal recording apparatus records information on a thermal recording sheet, the thermal recording sheet having a thermal characteristic by which the information is recorded through heating the thermal recording sheet to a first temperature and information which has been recorded on the thermal recording sheet is erased therefrom by heating the thermal recording sheet to a second temperature. The thermal recording apparatus includes, a thermal head for heating the thermal recording sheet in a pattern, a recording controller for driving the thermal head so that the thermal recording sheet is heated to the first temperature in a pattern corresponding to the information to be recorded, and an erasing controller for supplying thermal energy to the thermal recording sheet on which information has been recorded by using the thermal head so that the thermal recording sheet is heated to the second temperature.

19 Claims, 22 Drawing Sheets

| TH. LEVEL \ LEVEL | I | II | III | IV |
|---|---|---|---|---|
| TH1 | X | O | O | O |
| TH2 | X | X | O | O |
| TH3 | X | X | X | O |
| STROBE | STR0 | STR1 | STR2 | — |
| DEGREE OF ERASING | b | c | d | e |

THERMAL RECORDING APPARATUS USING RECORDING SHEET MADE OF THERMAL REVERSIBLE MATERIAL

Matter enclosed in heavy brackets [ ] appears in the original patent but forms no part of this reissue specification; matter printed in italics indicates the additions made by reissue.

This application is a Continuation of application Ser. No. 07/873,152, filed on Apr. 24, 1992, now abandoned.

BACKGROUND OF THE INVENTION (1) Field of the Invention

The present invention generally relates to a thermal recording apparatus used as, for example, a printer for facsimile machines, and more particularly to a thermal recording apparatus in which information can be recorded on and erased from a recording sheet formed of a thermal reversible material.

(2) Description of Related Art

In general, facsimile machines receive information automatically. Thus, unnecessary information transmitted as a direct mail can be received. In this case facsimile machine recording sheets are wasted unnecessarily. Since facsimile machines for home use frequently receive unnecessary information, a law prohibiting such facsimile transmission will be enacted in the U.S. Alternatively, a facsimile machine having a function for checking an ID code has been proposed in order to prevent the receipt of unnecessary information. However, a satisfactory result has not been obtained.

Existence of a recording sheet having a property that information recorded thereon can be erased therefrom would solve the above problem with regard to receiving unnecessary information. "Proceedings of 4th Japanese Symposium on Non-impact Printing Technologies Symposium; Thermal Reversible Material and Recording Characteristics" reports that a sheet formed of a thermal reversible material can be used as the above recording sheet having the property that recorded information can be erased therefrom. The thermal reversible material has a characteristic that it reversibly transits between a first state and a second state in accordance with a temperature thereof. The thermal reversible material may include a photochromic material and a thermochromic material, and can be made of an organic macromolecular substance.

The thermal reversible material reported by the above identified document can be maintained in either a first state referred to as a milky white state or a second state referred to as a transparent state. That is, the thermal reversible material transits reversibly between the milky white state and the transparent state in accordance with an amount of heat added thereto; each of the states can be maintained at the normal temperature. In the milky white state, the thermal reversible material is turbid milky white. In the transparent state, the thermal reversible material is transparent. The reversible transition between the milky white state and the transparent state is effected in accordance with variation of the size of each crystal in organic low molecular particles dispersed in the resin forming the thermal reversible material.

A thermal recording sheet made of thermal reversible material has a structure, for example, as shown in FIG. 1.

Referring to FIG. 1, the thermal recording sheet has a black base layer 1, a thermal reversible material layer 2 and a protection layer 3, which layers are stacked in this order. The black base layer 1 may be made, for example, of a plastic film, a metal plate or the like. The black base layer 1 may be also formed of a paper and an under coat layer coated on the paper. The protection layer 3 is transparent and made, for example, of silicon resin, silicon rubber, polyamide, polysiloxane graft polymer, or the like. The thermal reversible material layer 2 is made, for example, of the thermochromic material described above. The thermal reversible material layer 2 reversibly transits between the milky white state and the transparent state, as shown in FIG. 2. Referring to FIG. 2, the thermal reversible material layer 2 remains in the milky white state at the normal temperature Ta. The thermal recording sheet is heated by a thermal head so that the temperature of the thermal reversible material layer 2 reaches a first temperature Tb. As a result, the thermal reversible material layer 2 transits from the milky white state to the transparent state, as shown by a solid line in FIG. 2. After this, the temperature of the thermal reversible material layer 2 decreases to the normal temperature Ta. At the normal temperature Ta, the thermal reversible material layer 2 is maintained in the transparent state. In a case where the thermal reversible material layer 2 is in the transparent state, the black base layer 1 is visible through the thermal reversible material layer 2 and the protection layer 3. Thus, due to heating the milky white recording sheet in a dotted pattern from the normal temperature Ta to the first temperature Tb, a black image corresponding to the dotted pattern is formed on the milky white recording sheet, as shown in FIG. 3.

When the thermal reversible material layer 2 is in the transparent state, the thermal recording sheet is heated by the thermal head so that the temperature of the thermal reversible material layer 2 reaches a second temperature Tc. As a result, the transmittance of the thermal reversible material layer 2 decreases, as shown by a dashed line in FIG. 2. Then the temperature of the thermal reversible material layer 2 decreases and reaches the normal temperature Ta, so that the thermal reversible material layer 2 returns to the milky white state. The thermal reversible material layer 2 remains in the milky white state at the normal temperature Ta. When the thermal reversible material layer 2 is in the milky white state, the thermal recording sheet is milky white. Thus, due to heating the thermal recording sheet on which the black image appears, to the second temperature Tc, the black image is erased from the milky white recording sheet.

An image forming apparatus using the thermal recording sheet made of thermal reversible material has been proposed in U.S. Pat. Nos. 4,839,731 and 4,851,924. In the conventional image forming apparatus disclosed in the references, a heating device (a thermal head) for recording images on the thermal recording sheet and a heating device for erasing the images therefrom are separated from each other. Since two separate thermal devices are required for recording and erasing images on and from the thermal recording sheet, a cost of the conventional image forming apparatus is high.

SUMMARY OF THE PRESENT INVENTION

Accordingly, a general object of the present invention is to provide a novel and useful thermal recording apparatus using a recording sheet made of a thermal reversible material in which the disadvantages of the aforementioned prior art are eliminated.

A more specific object of the present invention is to provide a thermal recording apparatus in which information recorded on a recording sheet made of a thermal reversible material can be erased therefrom without increasing cost of the thermal recording apparatus.

The above objects of the present invention are achieved by a thermal recording apparatus for recording information on a thermal recording medium, the thermal recording medium having a thermal characteristic by which the information is recorded thereon by heating the thermal recording medium at a first temperature and information that has been recorded on the thermal recording medium is erased therefrom by heating the thermal recording medium to a second temperature, the thermal recording apparatus comprising: a thermal head for heating the thermal recording medium in a pattern; recording means, coupled to the thermal recording medium and the thermal head, for driving the thermal head so that the thermal recording medium is heated to the first temperature in a pattern corresponding to the information to be recorded; and erasing means, coupled to the thermal recording medium and the thermal head, for supplying thermal energy to the thermal recording medium on which information has been recorded by using the thermal head so that the thermal recording medium is heated to the second temperature, wherein when recording, the recording means is activated in order to form the information on the thermal recording medium, and when erasing, the erasing means is activated in order to erase the information from the thermal recording medium.

The above objects are also achieved by a thermal recording apparatus for recording information on a thermal recording medium, the thermal recording medium having a thermal characteristic by which the information is recorded thereon through heating the thermal recording medium to a first temperature and the information recorded on the thermal recording medium is erased therefrom through heating the thermal recording medium to a second temperature, the thermal recording apparatus comprising: a thermal head for heating the thermal recording medium in a pattern; recording means, coupled to the thermal recording medium and the thermal head, for driving the thermal head so that the thermal recording medium is heated to the first temperature in a pattern corresponding to the information to be recorded; reading means for reading the thermal recording medium on which information has been recorded; setting means, coupled to the reading means, for setting an erasing area on the thermal recording medium based on a result obtained by the reading means, the erasing area including a pattern corresponding to the information recorded on the thermal recording medium; and erasing means, coupled to the thermal recording medium, the thermal head and the setting means, for supplying thermal energy to the erasing area set on the thermal recording medium by using the thermal head so that the erasing area on the thermal recording medium is heated to the second temperature, wherein the recording means is activated in order to form the information on the thermal recording medium, and the reading means, the setting means and the erasing means are activated in order to erase previously recorded information from the thermal recording medium.

According to the present invention, recording of information on the thermal recording medium and erasing of recorded information therefrom can be performed by using a single thermal head.

Additional objects, features and advantages of the present invention will become apparent from the following detailed description when read in conjunction with the accompanying drawings.

DESCRIPTION OF THE PREFERRED EMBODIMENTS

A description will now be given, with reference to FIGS. 4 through 7, of a thermal printer according to a first embodiment of the present invention. The thermal printer is applied, for example, to a facsimile machine.

Figure 4:
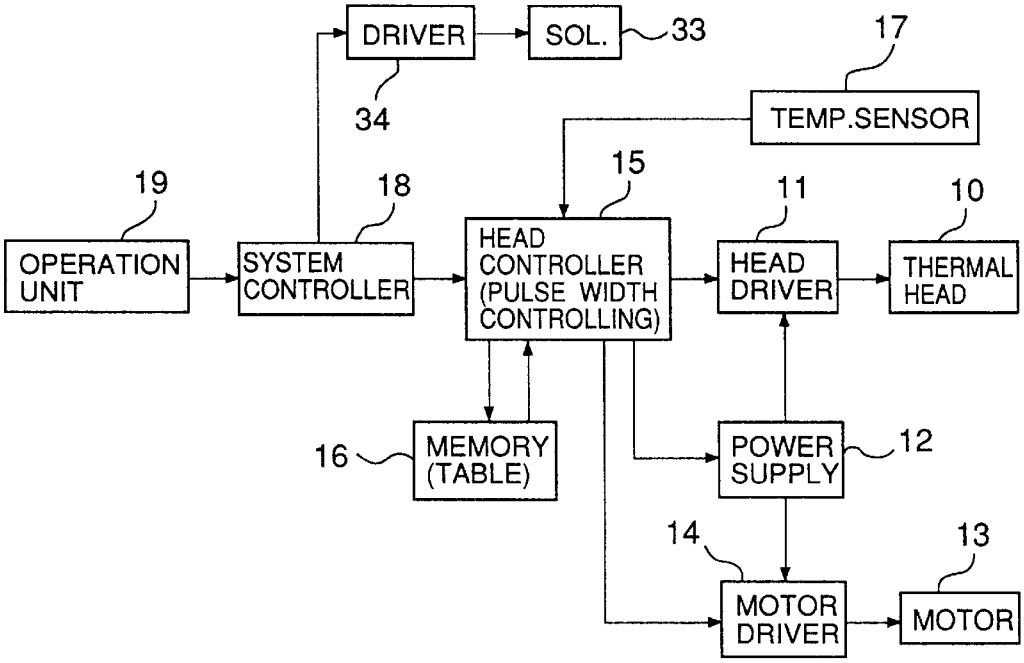
FIG. 4 is a block diagram illustrating a thermal printer according to a first embodiment of the present invention.

Referring to FIG. 4, a thermal head 10 is connected to a head driver 11 controlled by a head controller 15. An output voltage from a power supply 12 is supplied via the head driver 11 to the thermal head 10. The thermal head 10 is provided with a temperature sensor 17 (e.g. a thermistor). The temperature sensor 17 is mounted in a base of the thermal head 10 so as to detect a temperature of the thermal head 10. A detecting signal output from the temperature sensor 17 is supplied to the head controller 15. A motor 13 for feeding a thermal recording sheet is connected to a motor driver 14. A driving voltage output from the power supply 12 is supplied via the motor driver 14 to the motor 13 in accordance with instructions output from the head controller 15, so that the motor 13 is driven at a predetermined speed. A memory 16 is coupled to the head controller 15. A control table is stored in the memory 16. The control table will be described later.

An operation unit 19 by selecting a mode is connected to a system controller 18. An operator can supply various instructions including instructions of a recording mode and an erasing mode via the operation unit 19 to the system controller 18. In the recording mode, thermal head 10 can record images on thermal recording sheets. In the erasing mode, the thermal head 10 can erase the images from the thermal recording sheets. A solenoid 33, for switching a path selector between operating states, is connected to a driver 34 controlled by the system controller 18, so that the solenoid 33 is driven in accordance with instructions from the system controller 18. The system controller 18 also controls other parts of the facsimile machine including the thermal printer.

Figure 5:
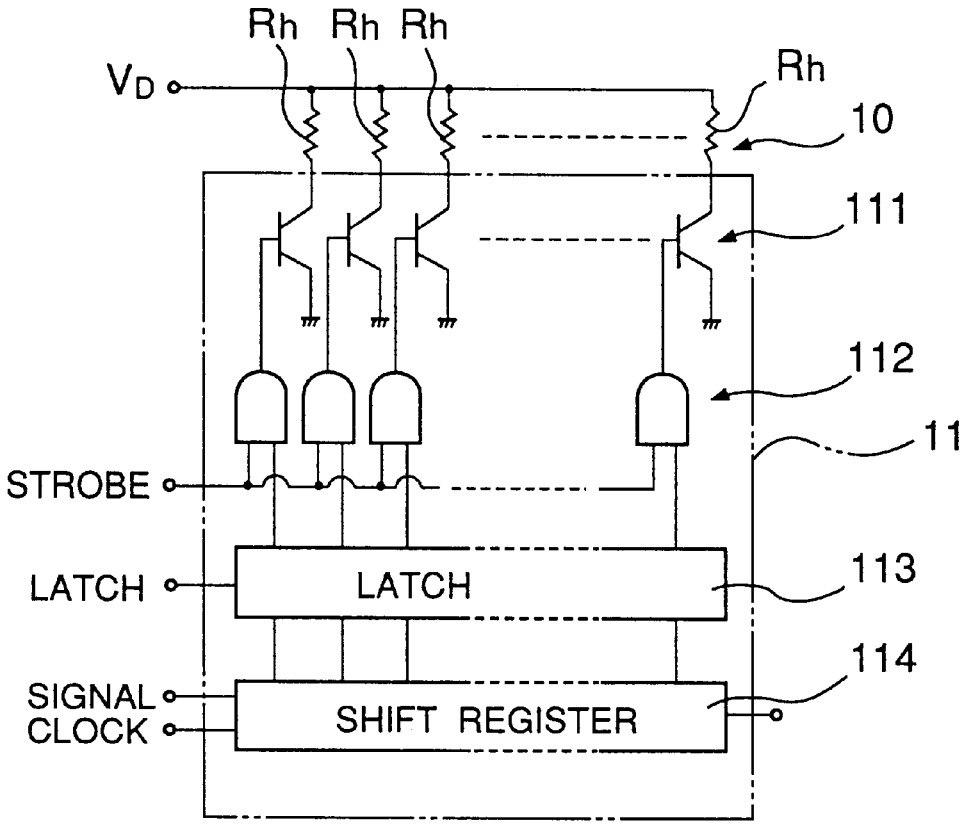
FIG. 5 is a circuit diagram illustrating a thermal head and a driving circuit thereof.

The thermal head 10 and the head driver 11 are formed, for example, as shown in FIG. 5.

Referring to FIG. 5, the thermal head 10 has a plurality of heating elements (Rh). The head driver 11 has a plurality of driving transistors 111, AND gates 112, a latch circuit 113 and a shift register 114. Each of the driving transistors 111 is connected to a corresponding one of the heating elements (Rh) of the thermal head 10 so that the output voltage $V_D$ from the power supply 12 can be supplied to each of the heating elements (Rh). Each of the driving transistors 111 is connected to an output terminal of one of the AND gates 112 so as to be turned on and off in accordance with an output signal of a corresponding one of the AND gates 112. A binary signal formed of a plurality of bits and a clock signal are supplied from the head controller 15 to the shift register 114. Each bit of the binary signal corresponds to one of the heater elements (Rh). The binary signal is set in the shift register 114 in synchronism with the clock signal. All bits of the binary signal set in the shift register 114 are latched into the latch circuit 113 in synchronism with a latch signal supplied from the head controller 15. Each bit of the binary signal set in the latch circuit 113 is supplied to a corresponding one of the AND gates 112. Each of the AND gates 112 is controlled in accordance with a strobe signal (STROBE) supplied from the head controller 15. The strobe signal (STROBE) is a pulse signal. While the strobe signal (STROBE) is being active (e.g. at a high level), the binary signal latched into the latch circuit 113 is supplied via the AND gates 112 to the driving transistors 111. Each of the driving transistors 111 to which a bit "1" of the binary signal is supplied is turned on, and the output voltage $V_D$ is supplied to a corresponding heating element (Rh) of the thermal head 10.

Figure 6A:
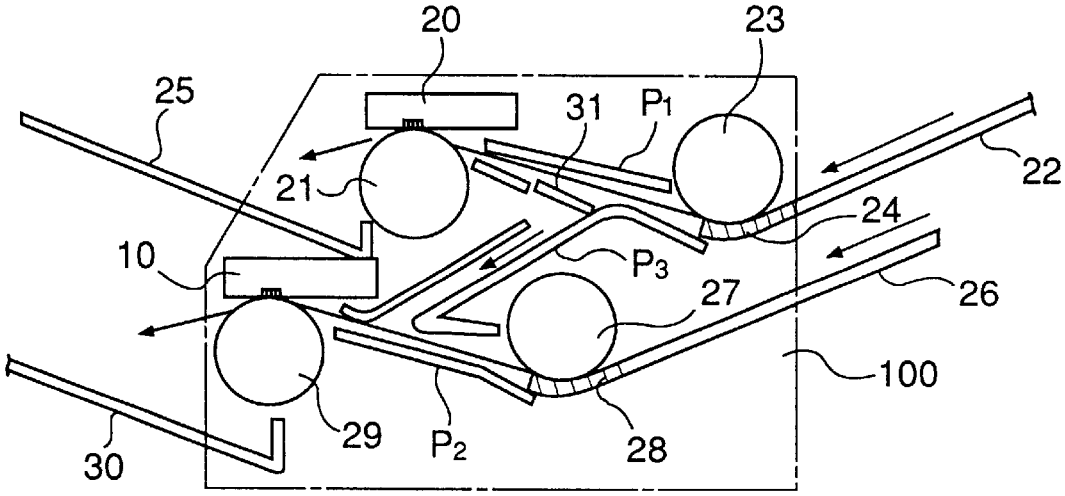
FIG. 6A is a diagram illustrating an example of a structure of a facsimile machine including the thermal printer.

The facsimile machine including the thermal printer is formed, for example, as shown in FIG. 6A.

Referring to FIG. 6A, a facsimile machine 100 has the thermal head 10 and a contact type image sensor 20 (hereinafter simply referred to as an image sensor 20). A document tray 22 is mounted on a housing of the facsimile machine 100 so as to project from the housing. A separation plate 24 is formed at an end of the document tray 22 inside the facsimile machine housing. A supplying roller 23 is provided so as to be in contact with the separation plate 24. A first path P1 extends towards the image sensor 20 from a position across from the separation plate 24 immediately down stream of the supplying roller 23 toward the image sensor 20. A feed roller 21 is in contact with the image sensor 20. Document papers set on the document tray 22 are separated by the separation plate 24 one by one and fed to the first path P1 by the supplying roller 23. The feed roller 21 presses each of the document papers fed through the first path P1 against the image sensor 20 and feeds it to a stacking tray 25. While each of the documents is being fed under a condition in which the document is in contact with the image sensor 20, images on the document are optically read by the image sensor 20.

A sheet tray 26 is mounted on the housing of the facsimile machine 100 so as to be positioned under the document tray 22. The sheet tray 26 projects from the housing. A separation plate 28 is formed at an end of the sheet tray 26 inside the housing. A supplying roller 27 is provided so as to be in contact with the separation plate 28. A second path P2 extends towards the thermal head 10 from a position on the side of the roller 27 opposite to the separation plate immediately down stream of the supplying roller 27. A feed roller 29 is in contact with a thermal head 10. Thermal recording paper stacked on the sheet tray 26 are separated by the separation plate 28 one by one and fed to the second path P2 by the supplying roller 27. The feed roller 29 presses each of the thermal recording papers fed through the second path P2 against the thermal head 10 and feeds it to a stacking tray 30. While each of the thermal recording papers is being fed under a condition where the thermal recording paper is in contact with a thermal head 10, the thermal head 10 records images on the thermal recording paper.

Figure 6B:
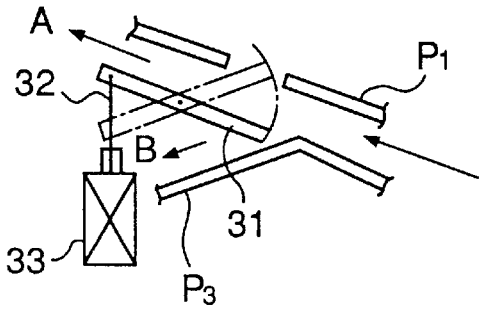
FIG. 6B is a diagram illustrating a constitution of a path selector.

The first path P1 and the second path P2 are connected by a third path P3. A path selector 31 (made of a plate) is provided at a position at which the first and third paths P1 and P3 are connected to each other. The path selector 31 is rotatably supported approximately at a center thereof, and an end of the path selector 31 is connected to a plunger of the solenoid 33 via a lever 32, as shown in FIG. 6B. In a normal state where the solenoid 33 is inactive, the path selector 31 is positioned at a normal position so that the first path P1 is open and the third path P3 is shut, as shown by a solid line in FIG. 6B. When the solenoid 33 is activated, it pulls the lever 32 so that the path selector 31 is rotated at a predetermined angle. As a result, the first path P1 is shut by the path selector 31 and the third path P3 is opened, as shown by a dashed line in FIG. 6B. When the path selector 31 is in the above switched state, a sheet from the document tray 22 can be fed through the paths P1, P3 and P2 to the stacking tray 30.

Figure 1:
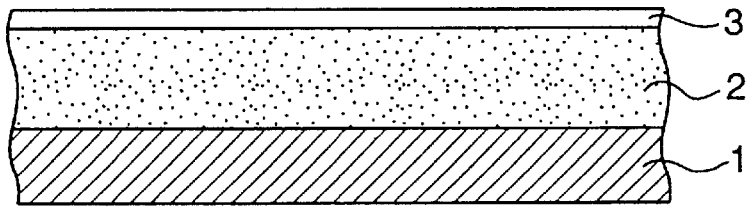
FIG. 1 is a cross sectional view showing a thermal recording sheet made of a thermal reversible material.
Figure 2:
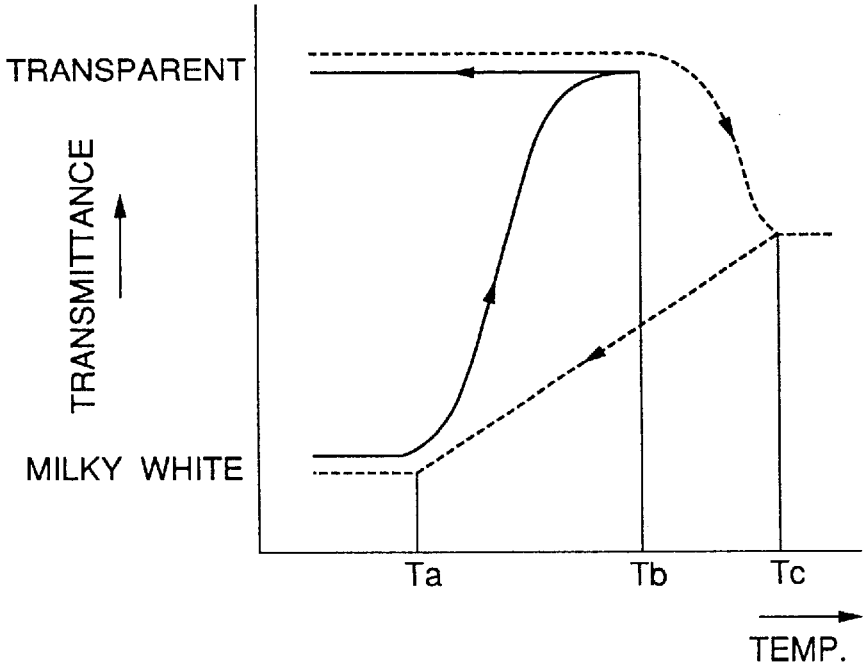
FIG. 2 is a diagram illustrating a thermal characteristic of the thermal reversible material.
Figure 3:
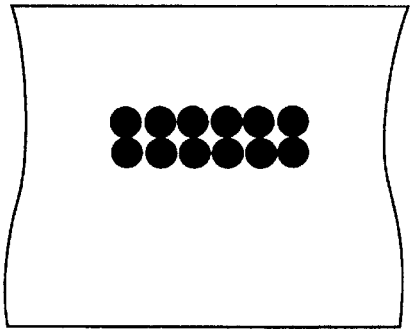
FIG. 3 is a diagram illustrating a black image formed on the thermal recording sheet.

The facsimile machine described above uses thermal recording sheets each having the structure shown in FIG. 1 and the thermal characteristic shown in FIG. 2. That is, when a thermal recording sheet is heated by the thermal head 10 to the first temperature Tb, images are recorded on the thermal recording sheet. When the thermal recording sheet having the images is heated by the thermal head 10 to the second temperature Tc greater than the first temperature Tb, the recorded images are erased from the thermal recording sheet.

A description will now be given of the control table stored in the memory 16.

The control table indicates pulse widths of the strobe signal (STROBE) used for driving the thermal head 10, as shown in the following Table.

TABLE

| TEMP. | PULSE WIDTH | |
|---|---|---|
| (° C.) | ERASING MODE | RECORDING MODE |
| –T1 | PW1 | PY1 |
| T1–T2 | PW2 | PY2 |
| T2–T3 | PW3 | PY3 |

In a case where a temperature of the thermal head 10 is less than T1, the pulse width of the strobe signal in the erasing mode is set to PW1, and the pulse width thereof in the recording mode is set to PY1 less than the PW1. In a case where a temperature of the thermal head 10 falls within the range T1–T2 (T1<T2), the pulse width of the strobe signal in the erasing mode is set to PW2 less than PW1, and the pulse width thereof in the recording mode is set to PY2 less than PW2. In a case where a temperature of the thermal head 10 falls within a range of T2–T3 (T2<T3), the pulse width of the strobe signal in the erasing mode is set to PW3 less than PW2, and the pulse width thereof in the recording mode is set to PY3 less than PW3. In the above three cases, the pulse width of the strobe signal in the erasing mode corresponds to the temperature Tc required for erasing recorded images from the thermal recording sheet, and the pulse width thereof in the recording mode corresponds to the temperature Tb required for recording images on the thermal recording sheet. The larger the pulse width of the strobe signal, the longer the thermal recording sheet is heated by the thermal head 10.

The facsimile is normally automatically set in the recording mode. When the facsimile machine receives image information transmitted from another terminal, the image information is supplied from the system controller 18 to the head controller 15. The head controller 15 receives a detection signal from the temperature sensor 17. Then the pulse width of the strobe signal, corresponding to the temperature of the thermal head 10 represented by the detection signal, is set to a predetermined value with reference to the control table shown in the above Table. For example, when the detected temperature of the thermal head 10 falls within the range of T1–T2, the pulse width of the strobe signal is set to the PY2. A binary signal corresponding to the received image information for one line and the strobe signal having the pulse width as set above are supplied from the the head controller 15 to the head driver 11. The output voltage $V_D$ is supplied from the power supply 12 to any of the heating elements (Rh) of the thermal head 10, corresponding to activate bits "1" in the binary signal, for a time corresponding to the pulse width of the strobe signal. Parts of the thermal recording sheet, in contact with heating elements (Rh) of the thermal head are heated to a temperature substantially equal to Tb, so that a dot image is formed on the thermal recording sheet.

When the thermal head 10 records the dot image on the thermal recording sheet, the motor 13 is controlled so that the thermal recording sheet is fed line by line at a predetermined speed. The speed, at which the thermal recording sheet is fed, is determined taking into consideration of the pulse width of the strobe signal.

Figure 7:
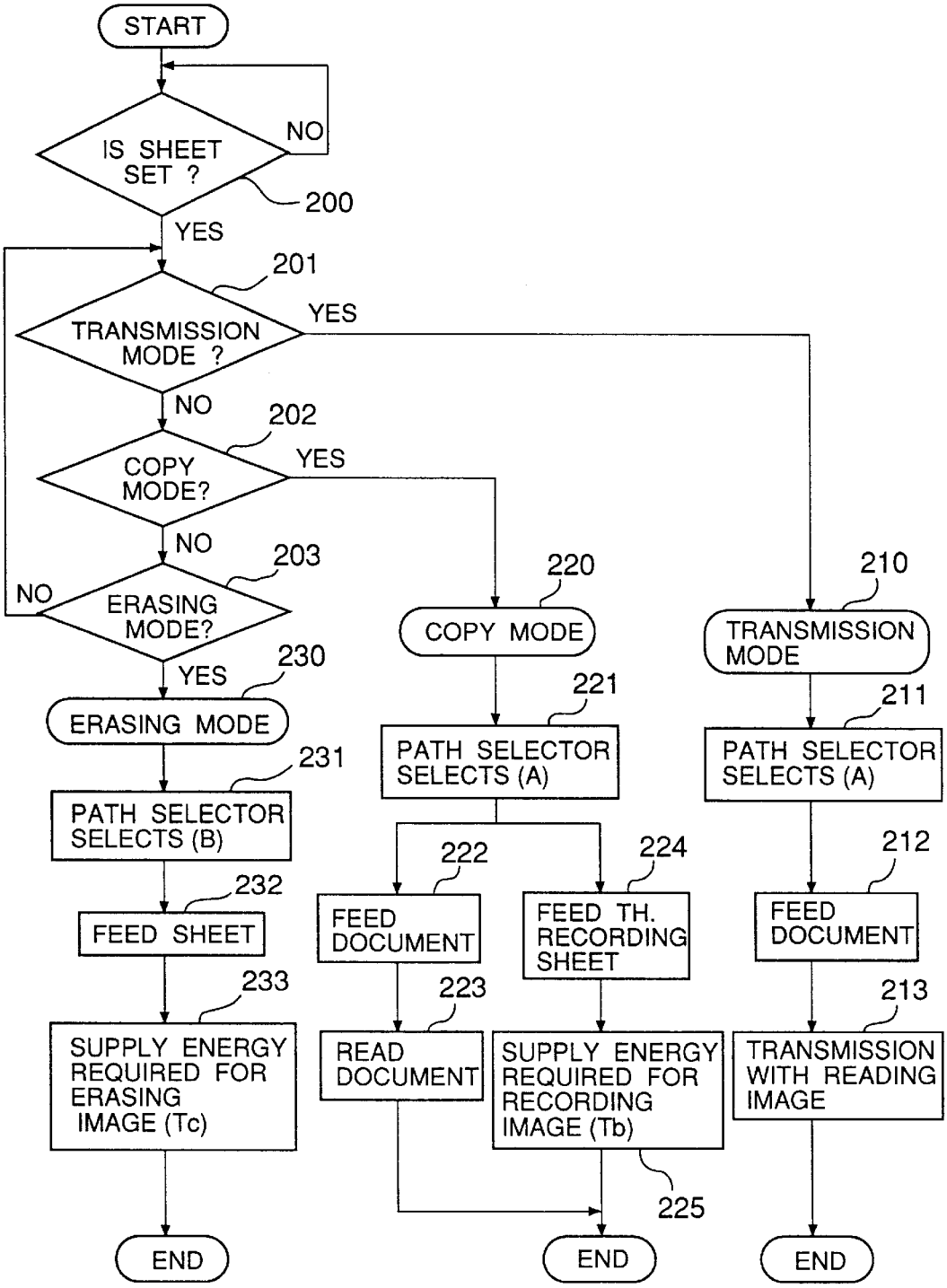
FIG. 7 is a flow chart illustrating a process carried out in the system controller shown in FIG. 4.

In a case where a sheet is set on the document tray 22, the facsimile machine operates in accordance with a process shown in FIG. 7.

Referring to FIG. 7, step 200 determines whether or not a sheet is set on the document tray 22 based on an output signal supplied from a sensor (not shown) provided on the document tray 22. When step 200 determines that a sheet is set on the document tray 22, step 201 determines whether or not a transmission mode is required via the operation unit 19. When the result obtained in step 201 is YES, a process in a transmission mode is activated (step 210). In the transmission mode, step 211 maintains the path selector 31 at the normal position. Step 212 feeds the sheet (a document) from the document tray 22 to the first path P1. The document is further fed through the first path P1 in a direction A indicated in FIG. 6b to the image sensor 20. Then the image sensor 20 optically reads the document. Step 213 transmits image information obtained in accordance with a reading operation of the image sensor to an identified facsimile terminal.

On the other hand, when step 201 determines that the instruction from the operation unit 19 does not relate to the transmission mode, step 202 determines whether or not a copy mode is requested via the operation unit 19. When the result obtained in step 202 is YES, a process in the copy mode is activated (step 220). In the copy mode, step 221 maintains the path selector 31 at the normal position. Then step 222 feeds the document from the document tray 22 to the first path P1. The document is fed through the first path P1 in the direction A to the image sensor 20. Step 223 controls the image sensor 20 so that the image sensor 20 optically reads the document, and then image information obtained by a reading operation of the image sensor 20 is stored in the memory 16. After step 221, step 224 feeds a thermal recording sheet from the sheet tray 26 to the second path P2. The thermal recording sheet is fed through the second path P2 to the thermal head 10. Step 225 controls the thermal head 10 so that the image information stored in the memory 16 is recorded on the thermal recording sheet. In step 225 for recording the image information onto the thermal recording sheet, the pulse width of the strobe signal is set, with reference to the control table shown in the above Table, to one of values PY1, PY2 and PY3 in accordance with a detected temperature of the thermal head 10. For example, when the temperature detected by the temperature sensor 17 is in the range T2–T3, the pulse width of the strobe signal is set to PY3. Then the thermal head 10 is driven by using the strobe signal having pulse width PY3, so that a dot image corresponding to the image information read by the image sensor 20 is formed on the thermal recording sheet.

Further, when step 202 determines that the instruction from the operation unit 19 does not relate to the transmission mode, step 203 determines whether or not the erasing mode is requested via the operation unit 19. When the result obtained in step 203 is YES, a process in the erasing mode is activated (step 230). The operator sets on the document tray 22 the thermal recording sheet on which a dot image was formed in the receiving mode. In the erasing mode, step 231 controls the solenoid 33 so as to switch the path selector 31 from the normal position to the switched position. Step 232 feeds the thermal recording sheet from the document tray 22 to the first path P1. Because the path selector 31 is at the switched position, the thermal recording sheet is fed in a direction B shown in FIG. 6B. Then the thermal recording sheet is fed through the third path P3 and the second path P2 to the thermal head 10. Step 233 controls the thermal head 10 so that the dot image formed on the thermal recording sheet is erased therefrom. In step 233 for erasing the dot image from the thermal recording sheet, the pulse width of the strobe signal is set, with reference to the control table shown in the above Table, to one of values PW1, PW2 and PW3 in accordance with a detected temperature of the thermal head 10. For example, when the temperature detected by the temperature sensor 17 is in the range T1–T2, the pulse width of the strobe signal is set to PW2. The strobe signal having pulse width PW2 and an erasing signal are supplied from the head controller 15 to the head driver 11. The erasing signal is a binary signal in which all bits are in active state "1". The head driver 11 drives the thermal head 10 based on the erasing signal and the strobe signal having pulse width PW2. The output voltage $V_D$ is supplied to all the heating elements (Rh) of the thermal head 10 for a time corresponding to the pulse width PW2 of the strobe signal. All the heater elements of the thermal head 10 heat the thermal recording sheet. As a result, each line is heated by the thermal head 10 at a temperature substantially equal to the second temperature Tc while the thermal recording sheet is being fed. Thus, the dot image formed on the thermal recording sheet is erased therefrom, and the thermal recording sheet is stacked on the stacking tray 30.

According to the first embodiment, in the recording mode (the receiving mode and the copy mode), the thermal head 10 is driven by using the strobe signal having the pulse width required for heating the thermal recording sheet at the first temperature Tb (see FIG. 2). In the erasing mode, the thermal head 10 is driven the strobe signal having a pulse width required for heating the thermal recording sheet to the second temperature Tc (See FIG. 2). Thus, the thermal head 10 can be used both for recording an image on the thermal recording sheet and erasing the image therefrom.

In the above first embodiment, the pulse width of the strobe signal is controlled so that a time for which the thermal recording sheet is heated is controlled. Due to the control of the pulse width of the strobe signal, a recording and an erasing of a dot image on and from the thermal recording sheet can be performed. However, the present invention is not limited to the control of the pulse width of the strobe signal. Additionally, an amount of thermal energy supplied to the thermal recording sheet may be controlled in accordance with operation modes; the recording mode and the erasing mode. The amount of the thermal energy supplied to the thermal recording sheet can be controlled by controlling, for example, a level of a voltage $V_D$ supplied to the thermal head 10. The amount of the thermal energy supplied to the thermal recording sheet can be also controlled by controlling a speed at which the thermal recording sheet is fed. In addition, the amount of the thermal energy supplied to the thermal recording sheet can be controlled by controlling a contact pressure of the thermal head on the thermal recording sheet.

Figure 8A:
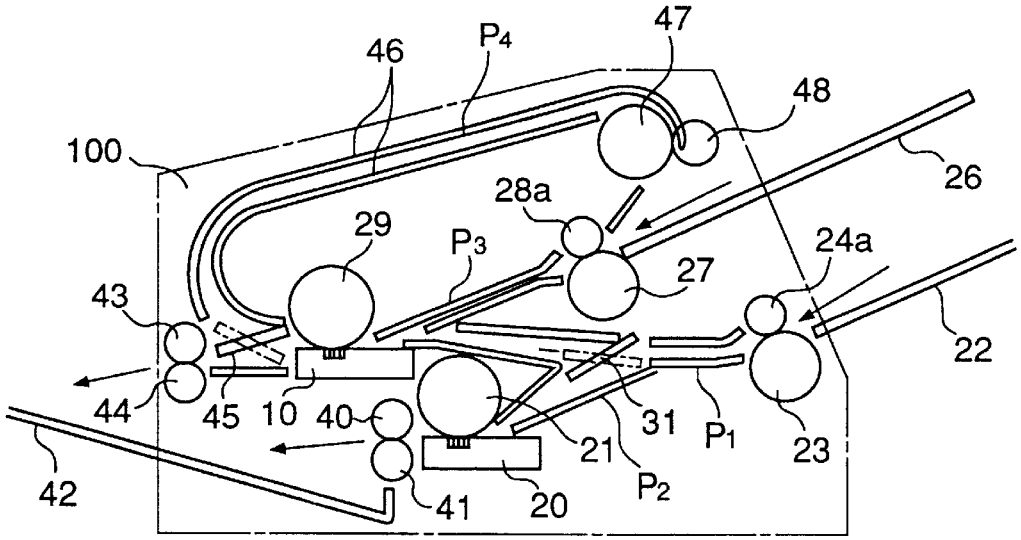
FIG. 8A is another example of a structure of a facsimile machine including the thermal printer.

FIG. 8A shows a facsimile machine having a thermal printer according to a modification of the first embodiment. In FIG. 8A, those parts which are the same as those shown in FIG. 6A are given the same reference numbers. In the facsimile machine shown in FIG. 8A, after an image recorded on the thermal recording sheet is erased therefrom, the thermal recording sheet is automatically returned to the sheet tray 26 for stacking recording sheets.

Referring to FIG. 8A, the document tray 22 is positioned under the sheet tray 26. A first path P1 is formed between the document tray 22 and the thermal head 10. A second path P2 extending to the image sensor 20 is connected to the first path P1. A first path selector 31 is provided at a position at which the first and second paths are connected to each other. When the first path selector 31 is in an inactive state, the first path selector 31 is positioned at the normal position. In the normal position of the first path selector 31, the first path P1 is shut by the first path selector 31 and the second path P2 is open. Thus, in the transmission mode or the copy mode, after a document stacked on the document tray 22 is fed to the first path P1 by the feed roller 23 and a separation roller 24a, the document is fed through the first and second paths P1 and P2 to the image sensor 20. The document is then optically read by the image sensor 20, and is ejected to a sheet stacker 42 by an ejection roller 40 and a roller 41.

A third path P3 is formed between the sheet tray 26 and the thermal head 10. In the recording mode, after a thermal recording sheet stacked on the sheet tray 26 is fed to the third path P3 by the supplying roller 27 and a separation roller 28a, the thermal recording sheet is fed through the third path P3 to the thermal head 10. The thermal head 10 then records an image on the thermal recording sheet, and the thermal recording sheet having the image is fed between an ejection roller 43 and a roller 44 via a second path selector 45. The thermal recording sheet is ejected to the sheet stacker 42 by the ejection roller and the roller 44.

A fourth path P4 is formed by guide plates 46 so as to extend from the second path selector 45 toward the sheet tray 26. An ejection set roller 47 and a roller 48 are provided at an end of the fourth path P4 facing the sheet tray 26. The second path selector 45 is normally positioned so that a path is formed between the thermal head and the ejection roller 44. In this case, the fourth path P4 is shut by the second path selector 45. When the second path selector 45 is an active state, the fourth pad P4 is open and the path between the thermal head 10 and the ejection roller 44 is shut.

In the erasing mode, the facsimile machine is operated as follows.

Figure 8B:
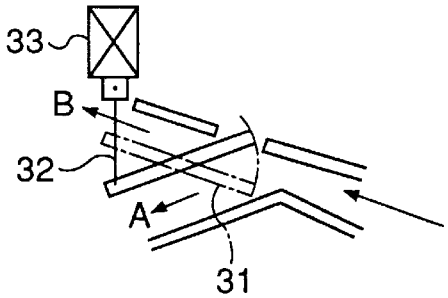
FIG. 8B is a diagram illustrating a constitution of a path selector used in the facsimile machine shown in FIG. 8A.
Figure 8C:
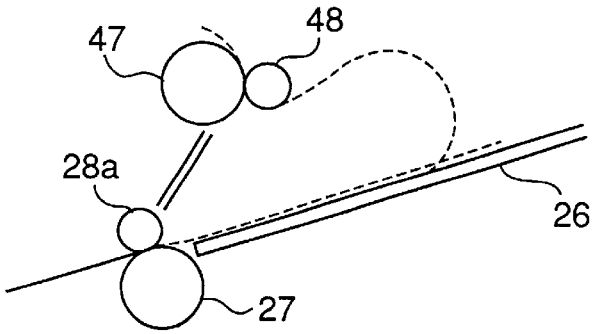
FIG. 8C is a diagram illustrating a state where a thermal recording sheet is ejected to a sheet tray.

The first path selector 31 is activated. That is, the first path selector 31 is pulled by the the solenoid 33 via the lever 32, so that the first path P1 is opened and the second path P2 is shut, as shown in FIG. 8B. In addition, the second path selector 45 is activated, so that the fourth path P4 is open. In this state, the thermal recording sheet having an image is set on the document sheet 22. The thermal recording sheet is fed from the document sheet to the thermal head 10 through the first path P1. The thermal head 10 supplies thermal energy to the thermal recording sheet in the same manner as described above, so that the image recorded on the thermal recording sheet is erased therefrom. After passing between the thermal head 10 and the feed roller 29, the thermal recording sheet from which the image has been erased is fed through the fourth path P4 toward the sheet tray 26. While the thermal recording sheet is being fed through the fourth path P4, the thermal recording sheet is turned round once. The thermal recording sheet is ejected from the fourth path P4 to the sheet tray 26 by the ejection set roller 47 and the roller 48. When a leading end of the thermal recording sheet knocks against the supply roller 27, a backside portion of the thermal recording sheet is still being fed by the ejection set roller 47 and the roller 48, as shown in FIG. 8C. Thus, before the thermal recording sheet is completely ejected to the sheet tray 26, the thermal recording sheet is bent as shown by a dashed line in FIG. 8C. Then, when a tailing end of the thermal recording sheet is separated from the ejection set roller 47, the thermal recording sheet bent as shown in FIG. 8C is restored to a flat state, and stacked on the sheet tray 26. The thermal recording sheet stacked on the sheet tray 26 can be automatically reused for recording.

In a case where a plurality of thermal recording sheets are stacked on the sheet tray 26, the thermal recording sheets are fed to the third path P3 one by one from the bottom. The thermal recording sheet from which an image has been erased is ejected from the fourth path P4 and stacked on the top of thermal recording sheets on the sheet tray 26. Thus, the thermal recording sheet from which an image has been erased is not used for recording image immediately after being stacked on the top of the thermal recording sheets.

In the facsimile machines shown in FIGS. 6A and 8A, the sheet trays 26 and 22 are inclined so that the leading end of each thermal recording sheet stacked thereon knocks against the supplying roller 27 due to a weight of each thermal recording sheet.

A description will now be given, with reference to FIGS. 9 through 13, of a second embodiment of the present invention.

Figure 9:
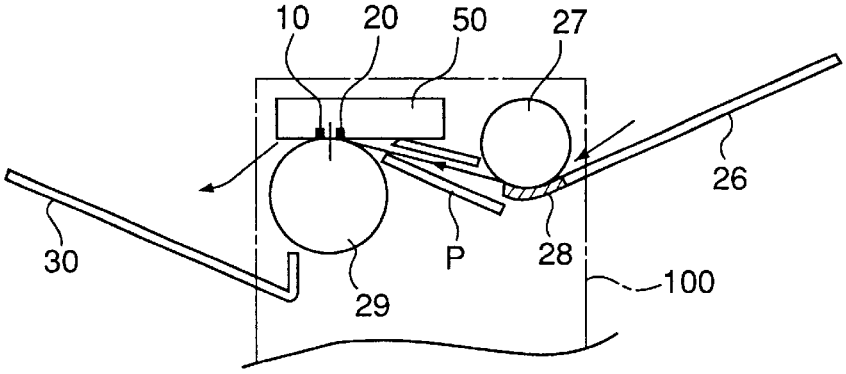
FIG. 9 is a diagram illustrating a structure of a facsimile machine having a thermal printer according to a second embodiment of the present invention.

FIG. 9 shows an example of a structure of a facsimile machine according to the second embodiment of the present invention. In FIG. 9, those parts which are the same as those shown in FIGS. 6A and 8A are given the same reference numbers.

Referring to FIG. 9, the sheet tray 26 is mounted on a housing of the facsimile machine 100 so as to project from the housing. The separation plate 28 is formed at an end of the sheet tray 26. The supplying roller 27 is in contact with the separation plate 28. A read/write unit 50 is mounted in the housing of the facsimile machine 100. A feed path P is provided between the supplying roller 27 and the read/write unit 50. The thermal head 10 and the image sensor 20 are mounted on the read/write unit 50 so as to be in contact with the feed roller 29. The thermal head 10 is positioned at a position down stream side of the image sensor 20.

In a transmission mode, a document is fed from the sheet tray 26 through the feed path P to the read/write unit 50. After being optically read by the image sensor 20, the document is ejected to the stacking tray 30. Image information obtained by the image sensor 20 is transmitted to other facsimile terminals. In a recording mode (a receiving mode or a copy mode), a thermal recording sheet is fed from the sheet tray 26 to the read/write unit 50. The thermal head 10 records image information on the thermal recording sheet in the same manner as in the first embodiment described above. After the thermal head 10 in the read/write unit 50 optically prints the image on the thermal recording sheet, the thermal recording sheet is ejected to the stacking tray 30.

Figure 10:
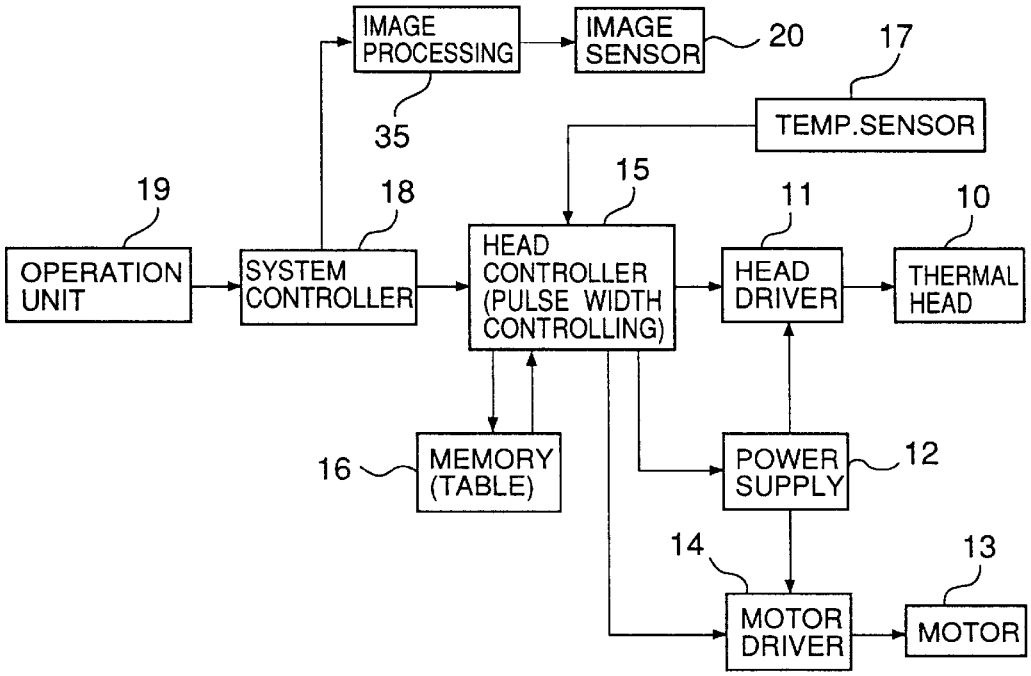
FIG. 10 is a block diagram illustrating a thermal printer according to the second embodiment of the present invention.

A circuit for controlling the thermal printer in the facsimile machine is formed as shown in FIG. 10. In FIG. 10, those parts which are the same as those shown in FIG. 2 are given the same reference numbers.

The circuit shown in FIG. 10 has almost the same structure as that shown in FIG. 2. In FIG. 10, the image sensor 20 is coupled to the system controller 18 via an image processing unit 35. Output signals from the image sensor 20 are converted, by the image processing unit 35, into image information dot by dot. The image information obtained by the image processing unit 35 is supplied to the system controller 18.

Figure 11:
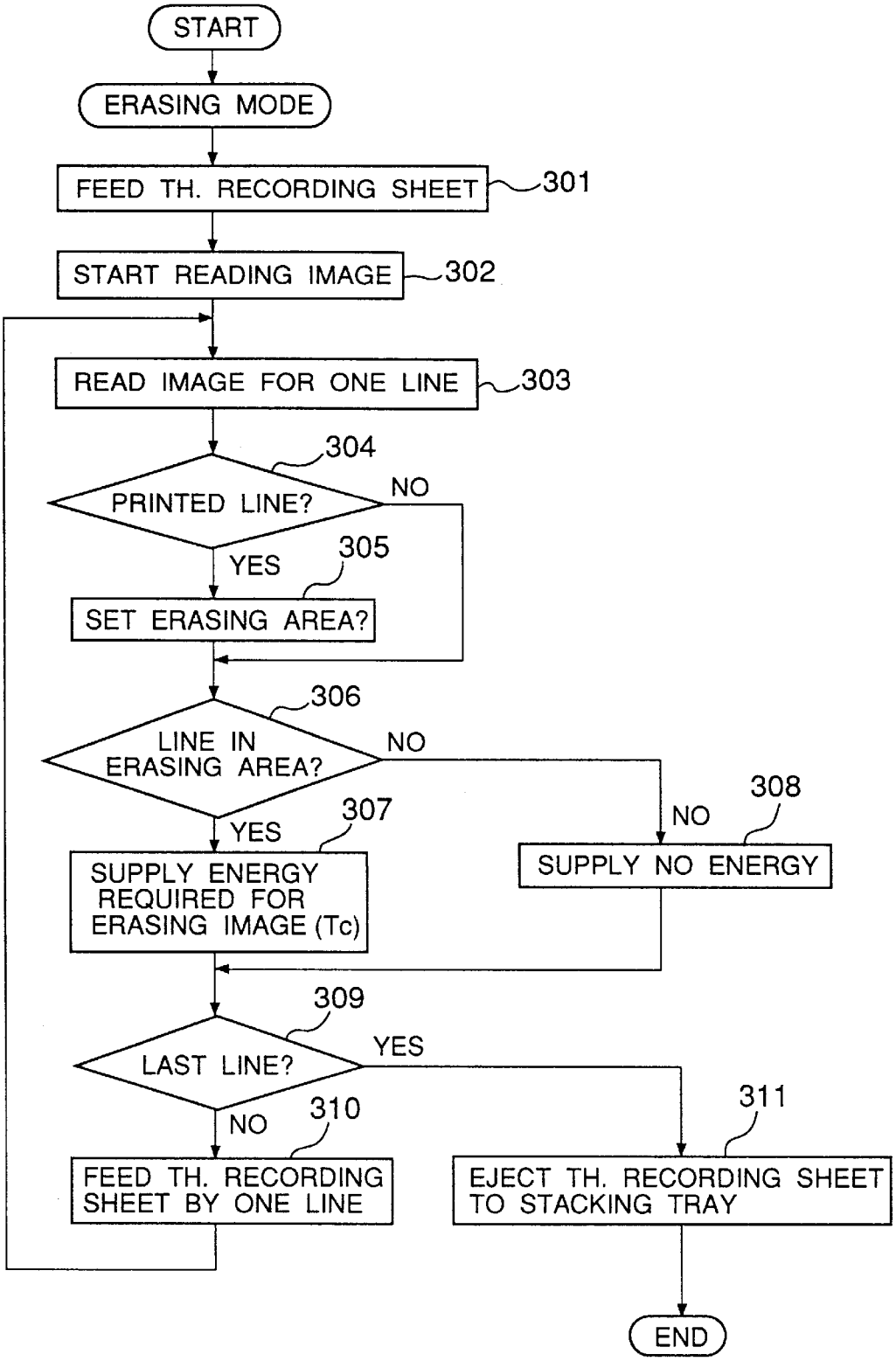
FIG. 11 is a flow chart illustrating a process in an erasing mode performed by the thermal printer shown in FIG. 10.

In erasing mode, a process for erasing an image from a thermal recording sheet is carried out in accordance with a flow chart shown in FIG. 11.

Figure 12:
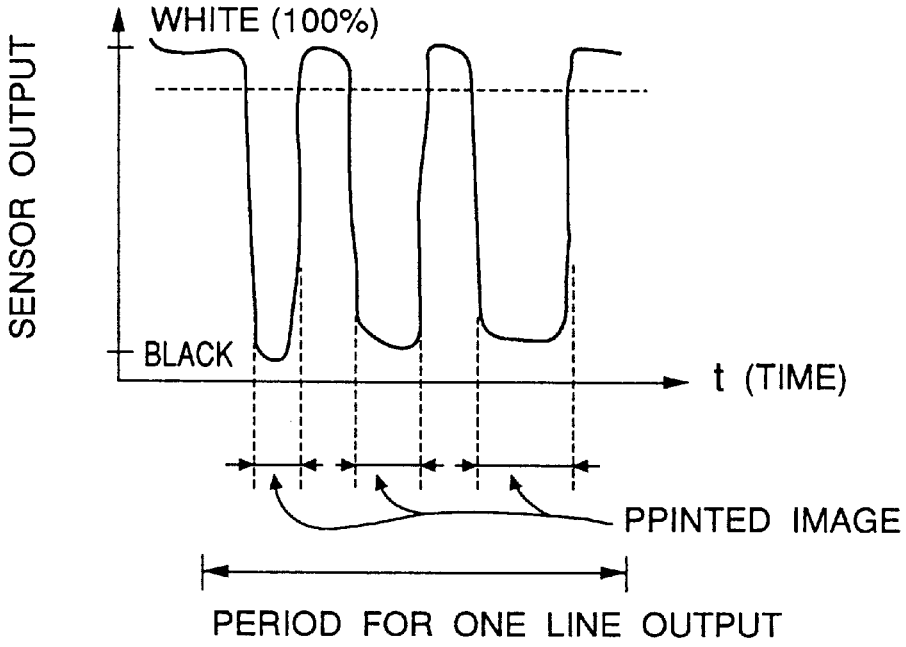
FIG. 12 is a wave form chart illustrating an example of an output signal from an image sensor.
Figure 13:
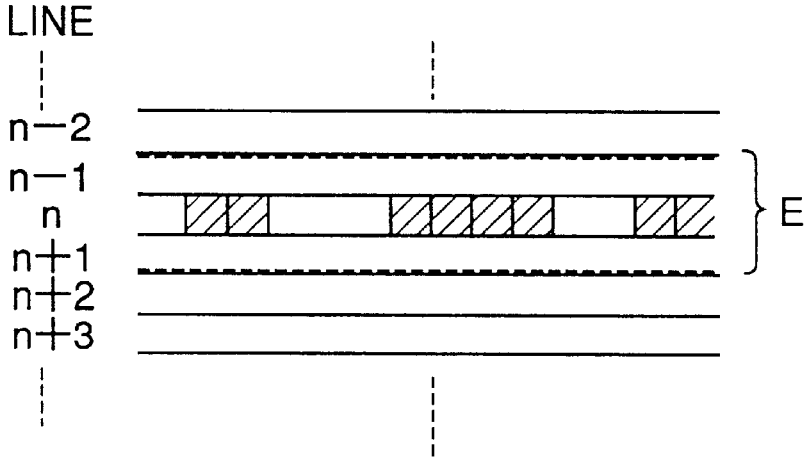
FIG. 13 is a diagram illustrating an example of an erasing area.

Referring to FIG. 11, the erasing mode is activated in accordance with an instruction input from the operation unit 19, and then step 301 controls the supplying roller 27 so that a thermal recording sheet on which an image has been recorded is fed from the sheet tray 26 to the read/write unit 50 via the feed path P. The image formed on the thermal recording sheet constitutes of a plurality of line images, each line image having a plurality of dots arranged in a line. While the thermal recording sheet is being fed between the read/write unit 50 and the feed roller 29, the image sensor 20 is activated (step 302). After step 302, step 303 inputs image information for one line supplied from the image sensor 20. A line corresponding to image information supplied from the image sensor is referred to as an objective line. Then step 304 determines whether or not the objective line is a line having printed dots (black dots) based on the image information supplied from the image sensor 20. When a detection signal output from the image sensor 20 has variations exceeding a threshold level as shown in FIG. 12, it is determined that the objective line is a line having printed dots. When the result obtained in step 304 is YES, step 305 defines erasing area formed of three lines, the objective line, a line positioned before the objective line and a line positioned after the objective line. In FIG. 13, in a case where the n-th line is the objective line, the erasing area E is formed of the (n−1)-th line, the objective line (the n-th line) and the (n+1)-th line. Area information regarding to the erasing area E is stored in the memory 16. After step 305, the process proceeds to step 306. When step 304 determines that the objective line is a line having no printed dots, the process directly proceeds to step 306.

Step 306 determines whether or not a line facing the thermal head 10 is included in the erasing area with reference to the area information stored in the memory 16. When step 306 determines that a line facing the thermal head is included in the erasing area, step 307 controls the thermal head so that thermal energy required for erasing images from the thermal recording sheet is supplied to the line on the thermal recording sheet. That is, the strobe signal and the erasing signal in which all bits are in the active state "1" are supplied from the head controller 15 to the head driver 11. The strobe signal has a pulse width selected from the pulse widths PW1, PW2 and PW3 in the above Table in accordance with the detected temperature of the thermal head 10. When the result obtained in step 306 is NO, step 308 controls the thermal head 10 so that the thermal head is maintained in an inactive state.

After step 307 or 308, step 309 determines whether or not the line facing the thermal head 10 is the last line on the thermal recording sheet. When step 309 determines that the line facing the thermal head 10 is not the last line, step 310 controls the motor 13 so that the thermal recording sheet is fed one more line. Then the process returns to step 303. When the result obtained in step 309 is YES, step 311 controls the motor 13 so that the thermal recording sheet is ejected from the facsimile machine and stacked on the stacking tray 30.

According to the second embodiment, in the erasing mode, the thermal energy required for erasing images is supplied to only the erasing area determined based on image information supplied from the image sensor 20. Thus, it is possible to save energy. In addition, the erasing area is formed of an objective line on which printed dots are detected and lines before and behind the objective line. Thus, the printed dots (a dot image) can be accurately erased from the thermal recording sheet.

Figure 14:
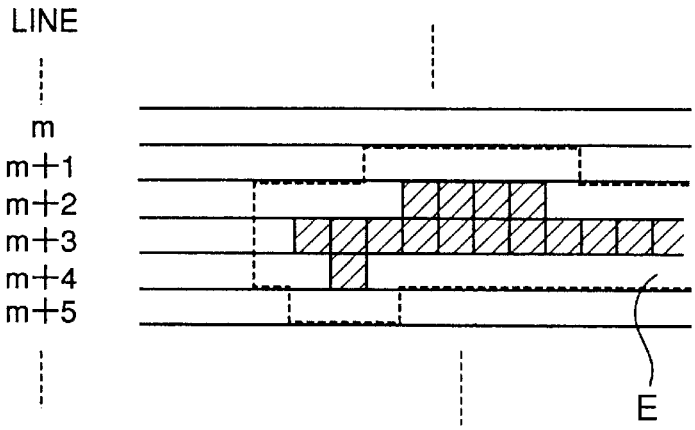
FIG. 14 is a diagram illustrating another example of an erasing area.

The erasing area can be defined as shown in FIG. 14. That is, an erasing area E is formed of printed dots (indicated by inclined lines) and 8 dots surrounding each printed dot. In this case, the erasing signal supplied to the head driver 11 in step 307 shown in FIG. 11 has active bits corresponding to only printed dots in each line.

Figure 15:
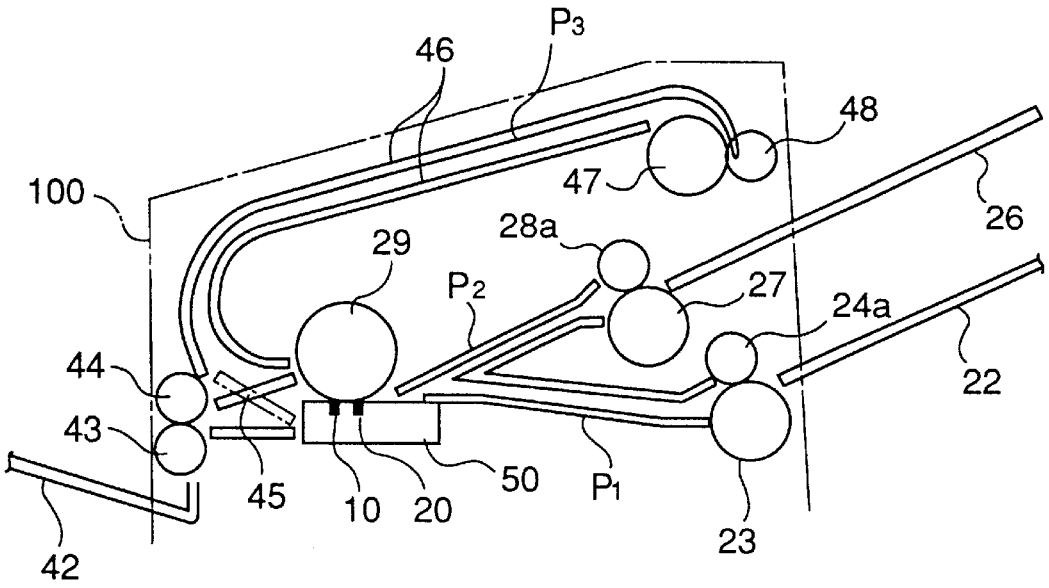
FIG. 15 is a diagram illustrating a structure of a facsimile machine having a thermal printer according to a modification of the second embodiment.

FIG. 15 shows a facsimile machine having a thermal printer according to a modification of the second embodiment. In FIG. 15, those parts which are the same as those shown in FIGS. 8A and 9 are given the same reference numbers. In the facsimile machine shown in FIG. 15, after an image recorded on the thermal recording sheet is erased therefrom, the thermal recording sheet is automatically returned to the sheet tray 26 for stacking recording sheets.

In FIG. 15, a first path P1 is formed between the document tray 22 and the read/write unit 50. A second path P2 is formed between the sheet tray 26 and the read/write unit 50. In the recording mode, the thermal recording sheets are fed from the sheet tray 26 through the second path P2 to the read/write unit 50 one by one. In the transmission mode, a document is fed from the document tray 22 through the first path P1 to the read/write unit 50. A third path P3 returns from a position immediately behind the read/write unit 50 to the sheet tray 26. The path selector 45 is provided at the position immediately behind the read/write unit 50 in the same manner as that shown in FIG. 8A. In the erasing mode, the thermal recording sheet having images formed thereon is fed from the document tray 22 to the read/write unit 50. Then the thermal head supplies thermal energy required for erasing the images from the thermal recording sheet thereto. After the image is erased from the thermal recording sheet by the thermal head 10, the thermal recording sheet is fed through the third path P3 to the sheet tray 26.

A description will now be given, with reference to FIGS. 16A through 21, of a third embodiment of the present invention. In the third embodiment, only images in an erasing area E shown in FIG. 16A can be erased from the thermal recording sheet. The erasing area E is an area surrounded by a marking line which is drawn by using a predetermined marker.

Figure 17A:
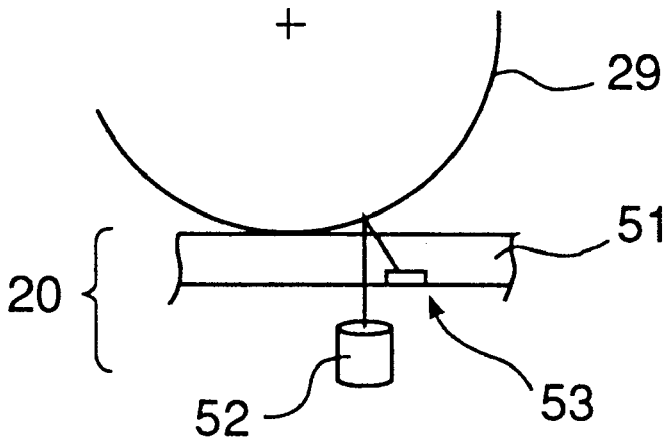
FIG. 17A is a detailed diagram illustrating an image sensor.
Figure 17B:
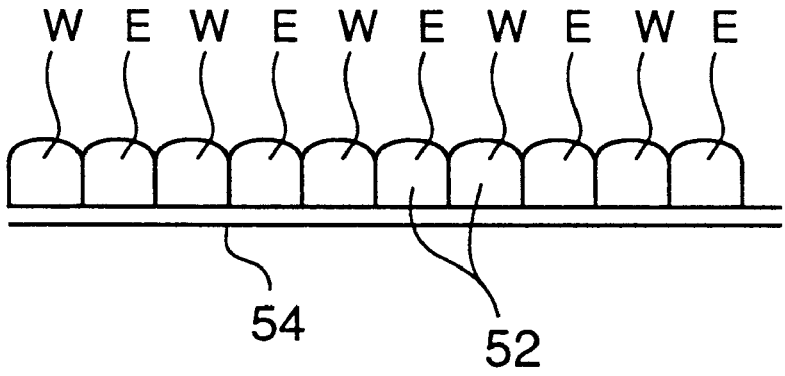
FIG. 17B is a detailed diagram illustrating an LED array included in the image sensor.
Figure 18A:
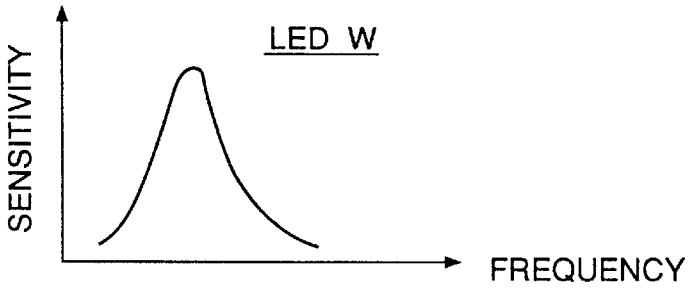
FIGS. 18A, 18B, 18C and 18D are graphs illustrating spectral characteristics of the image sensor.
Figure 18B:
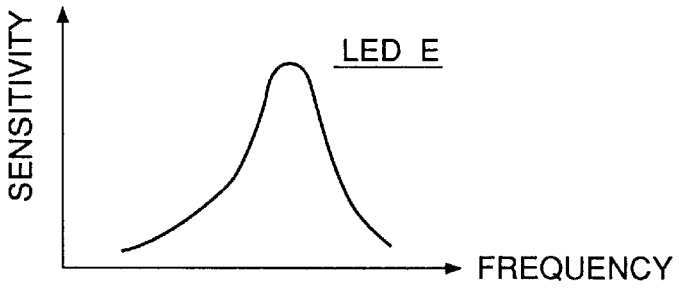
Figure 18C:
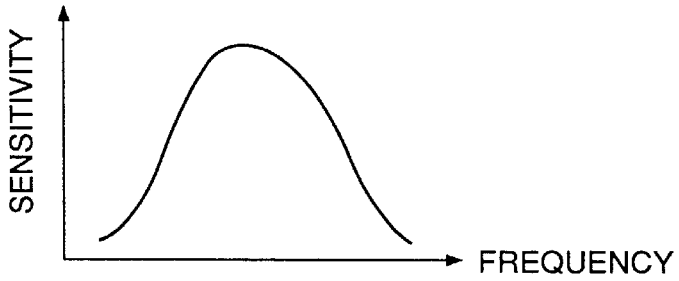
Figure 18D:
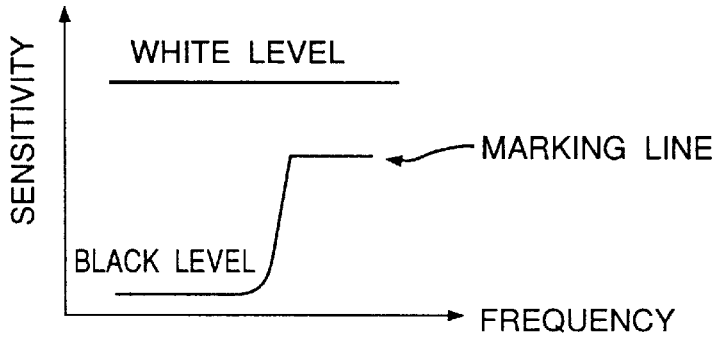

The facsimile machine according to the third embodiment has almost the same structure as that shown in FIG. 9. In the third embodiment, the optical sensor 20 is formed as shown in FIG. 17A. Referring to FIG. 17A, the image sensor 20 has a glass plate 51, an LED (Light Emitting Diode) array 52 and a photosensitive device 53 (e.g. CCD). The thermal recording sheet is fed along the glass plate 51 of the image sensor 20 by the feed roller 29. Light beams emitted from the LED array 52 are reflected by the thermal recording sheet and detected by the photosensitive device 53. The LED array 52 has a plurality of first LEDs (w) and a plurality of second LEDs (e), as shown in FIG. 17B. The first LEDs (w) and the second LEDs (e) are alternatively arranged on a base 54. Each of the first LEDs (w) has a spectral characteristic suitable for reading images formed on a sheet. Each of the second LEDs (e) has a spectral characteristic suitable for reading marking lines drawn for specifying erasing areas on a thermal recording sheet. FIG. 18A shows sensitivity characteristics of each of the first LEDs (w), and FIG. 18B shows sensitivity characteristics of each of the second LEDs (e). A frequency at which the maximum sensitivity of each of the first LEDs (w) is obtained differs from a frequency at which the maximum sensitivity of each of the second LEDs (e) is obtained. FIG. 18C shows a sensitivity characteristic of the photosensitive device 53. A spectral characteristic of the marking line is shown in FIG. 18D. In FIG. 18D, a sensitivity level of the marking line on the photosensitive device 53 is intermediate between a black level and a white level. The black level corresponds to a color of the black base layer 1 of the thermal recording sheet. The white level corresponds to a color of the thermal reversible material layer 2 of the thermal recording sheet which is in the milky white state.

Figure 19:
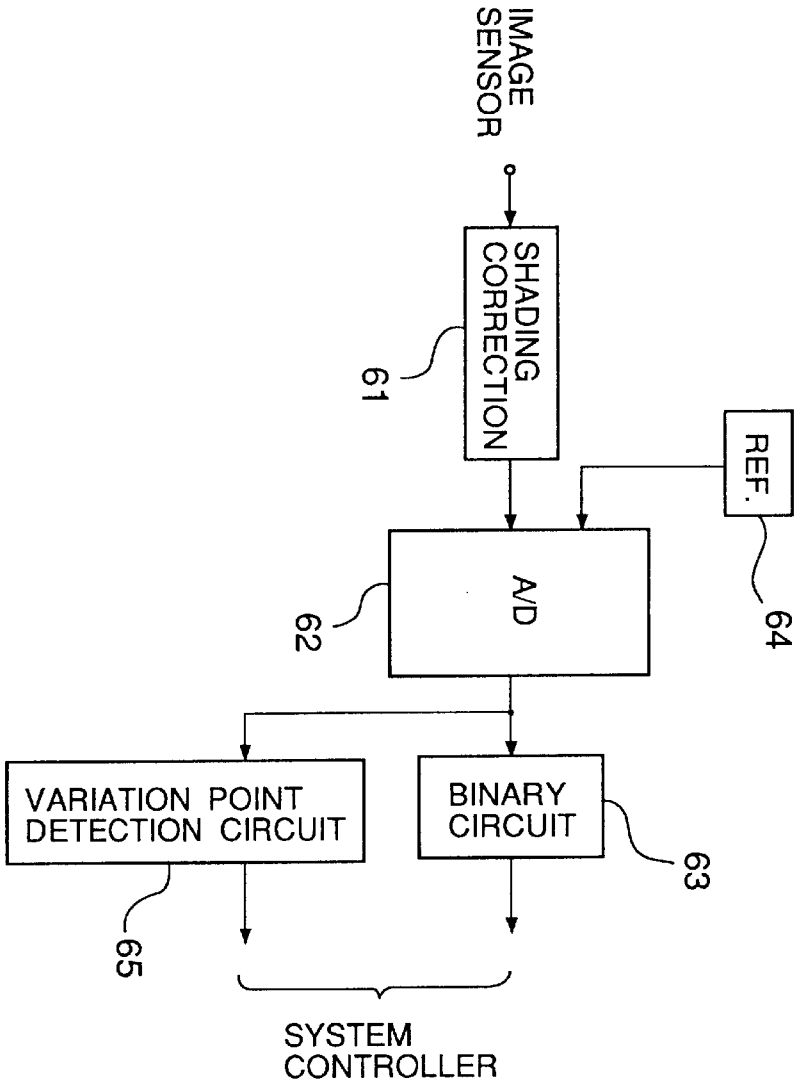
FIG. 19 is a block diagram illustrating an image processing unit.

The image processing unit 35 is formed as shown in FIG. 19. Referring to FIG. 19, the image processing unit 35 has a shading correction circuit 61, an analog to digital converter 62, a binary circuit 63, a reference generator 64 and a variation point detection circuit 65. A detection signal supplied from the image sensor 20 is corrected by the shading correction circuit 61. An output signal from the shading correction circuit is converted into digital image data by the analog to digital converter 62 based on a reference voltage output from the reference generator 64. The binary circuit 63 converts the digital image data into binary image data, and the binary image data is supplied to the system controller 18. The variation point detection circuit 65 detects predetermined variation points in image data for one line. The detection result obtained by the variation point detection circuit 65 is supplied to the system controller 18.

In the transmission mode, the first LEDs (w) of the LED array 52 are turned on and the second LEDs (e) thereof are maintained in an inactive state. A document sheet is fed from the document tray 22 to the read/write unit 50. Then the document is read by the photosensitive device 53 of the image sensor 20. Image information obtained by reading the document is transmitted to another facsimile terminal. In the recording mode, a thermal recording sheet is fed from the sheet tray 26 to the read/write unit 50. Then the thermal head 10 writes images corresponding to image information on the thermal recording sheet. In this case, the pulse width of the strobe signal is selected from the pulse widths PY1, PY2 and PY3 (reference with the above Table) in accordance with a detected temperature of the thermal head 10.

Figure 20:
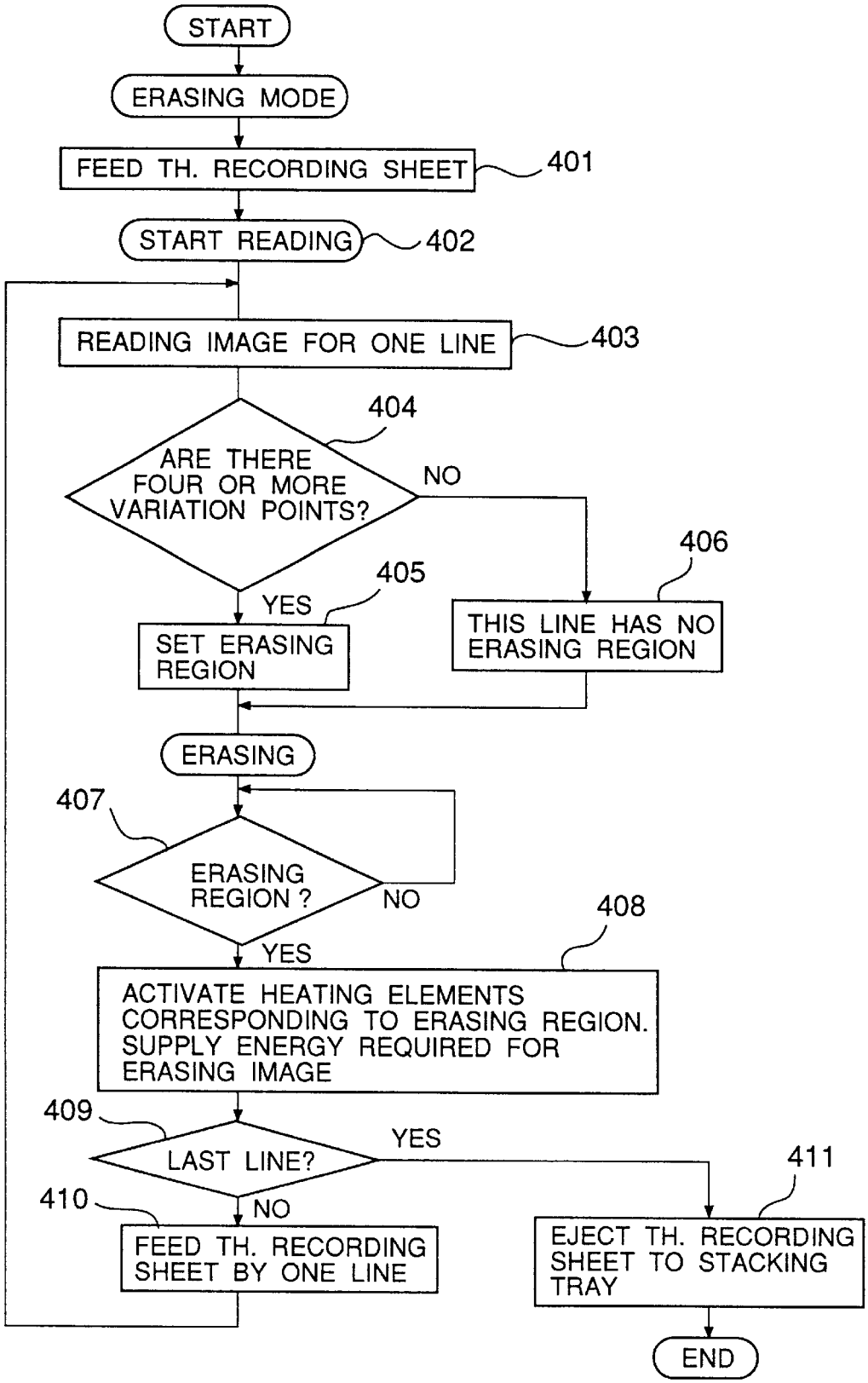
FIG. 20 is a flow chart illustrating a process in the erasing mode performed in a third embodiment.

In the erasing mode, a process for erasing an image from a thermal recording sheet is carried out in accordance with a flow chart shown in FIG. 20.

Referring to FIG. 20, the erasing mode is activated in accordance with an instruction input from the operation unit 19, and then step 401 controls the supplying roller 27 so that a thermal recording sheet on which an image has been recorded is fed from the sheet tray 26 to the read/write unit 50. In this case, the second LEDs (e) of the LED array 52 are turned on and the first LEDs (w) are maintained in an inactive state. While the thermal recording sheet is being fed along the glass plate 51 of the image sensor 20, the second LEDs (e) of the LED array 52 irradiate the thermal recording sheet. A reading of the thermal recording sheet starts in step 402. After step 402, step 403 inputs image information corresponding to an image signal for one line output from the photosensitive device 53 of the image sensor 20. Step 404 then determines whether or not the image information for one line includes four or more variation points based on the detection result obtained by the variation point detection circuit 65.

The variation point detection circuit 65 detects variation points as follows.

Figure 16A:
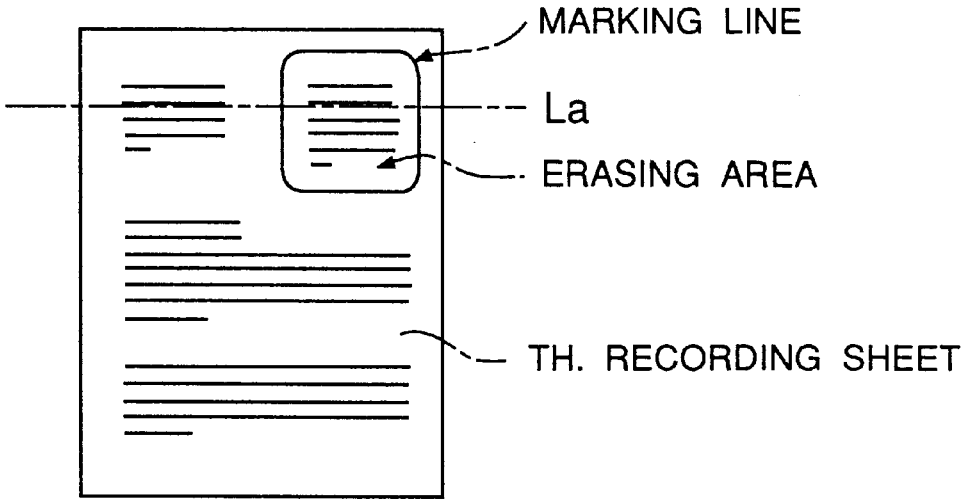
FIG. 16A is a diagram illustrating a thermal recording sheet having an erasing area surrounded by a marking line.
Figure 21:
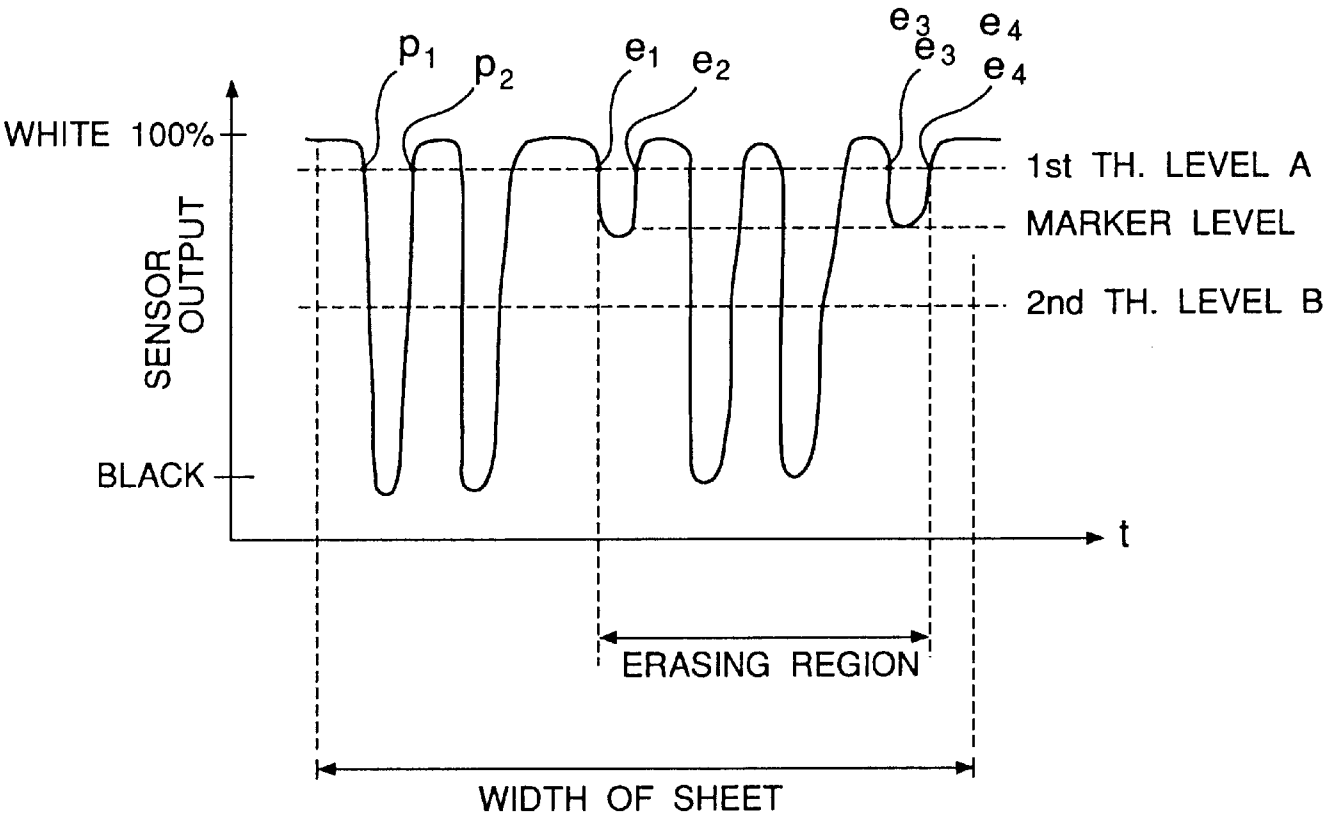
FIG. 21 is a wave form chart illustrating an example of an output signal of the image sensor reading a line including an erasing region.

In the variation point detection circuit 65, a first threshold level A and a second threshold level B which is less than the first threshold level A are set. The first threshold level A is intermediate between a marker level and the white level, and the second threshold level B is intermediate between the black level and the marker level, as shown in FIG. 21. The marker level is defined as a level of an image signal, output from the photosensitive device 53, corresponding to the marking line. A variation point is defined as a point at which the level of the image signal output from the image sensor 20 varies so as to pass through the first threshold level A from the white level to the marker level and vice versa. For example, in a case where an image signal (image information) for a line La shown in FIG. 16A is obtained as shown in FIG. 21, four variation points $e_1$, $e_2$, $e_3$ and $e_4$ are detected by the variation point detection circuit 65. The variation point detection circuit 65 detects as variation points only points at which the level of the image signal varies so as to pass through only the first threshold level A, but not both threshold levels A and B. Thus, for example, points $p_1$ and $p_2$ shown in FIG. 21 are not detected as the variation points.

In FIG. 20, when step 404 determines that the image information for one line includes four or more variation points, step 405 sets a region between a variation point positioned near an end of the line and a variation point positioned near another end of the line as an erasing region. The erasing region is a region in a line included in the erasing area E. In a case shown in FIG. 21, a region between the variation point $e_1$ and the variation point $e_4$ is detected as the erasing region. Information regarding the erasing region is stored in the memory 16. On the other hand, when step 404 determines that image information for one line does not include four or more variation points, step 406 sets information representing that the read line has no erasing region.

After step 405 or 406, a process for erasing images from the thermal recording sheet starts. Step 407 determines whether or not a line facing the thermal head 10 has an erasing region with reference to the information stored in the memory 16. When step 407 determines that a line facing the thermal head 10 has an erasing region, step 408 controls the thermal head 10 so that thermal energy required for erasing images from the thermal recording sheet is supplied to the erasing region of the line on the thermal recording sheet. That is, the strobe signal and the erasing signal in which only bits corresponding to the erasing region are in the active state "1" are supplied from the head controller 15 to the head driver 11. The strobe signal has a pulse width selected from the pulse widths PW1, PW2 and PW3 in the above Table in accordance with the detected temperature of the thermal head 10. As a result, a dot image in the erasing region is erased from the line.

After step 408, step 409 determines whether or not the line facing the thermal head 10 is the last line on the thermal recording sheet. When step 409 determines that the line facing the thermal head 10 is not the last line, step 410 controls the motor 13 so that the thermal recording sheet is fed by one line. Then the process returns to step 403. When the result obtained in step 409 is YES, step 411 controls the motor 13 so that the thermal recording sheet is ejected from the facsimile machine and stacked on the stacking tray 30.

According to the third embodiment, only an image formed in an erasing area surrounded by the marking line is erased from the thermal recording sheet. Thus, image information remaining after partially erasing unnecessary image information from received image information can be transmitted to another facsimile terminal.

Figure 16B:
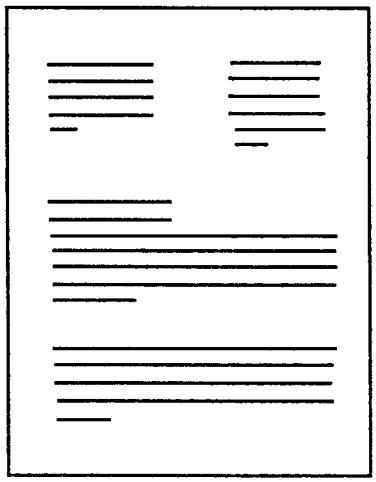
FIG. 16B is a diagram illustrating a thermal recording sheet having no erasing area.

In the facsimile machine according to the third embodiment, when an erasing area is not specified by a marking line, as shown in FIG. 16B, all images which have been recorded on the thermal recording sheet are erased therefrom in the same manner as that of the second embodiment.

In addition, the LED array 52 has the first LEDs (w) each having a spectral characteristic suitable for reading images on a sheet and the second LEDs (e) each having a spectral characteristic suitable for reading the marking lines. Thus, the erasing area E surrounded by the marking line can be accurately detected.

Since the image sensor 20 and the thermal head 10 are integrated with each other in one unit, down sizing of the facsimile machine can be achieved.

A description will now be given, with reference to FIGS. 22 through 29, of a fourth embodiment of the present invention.

Figure 22:
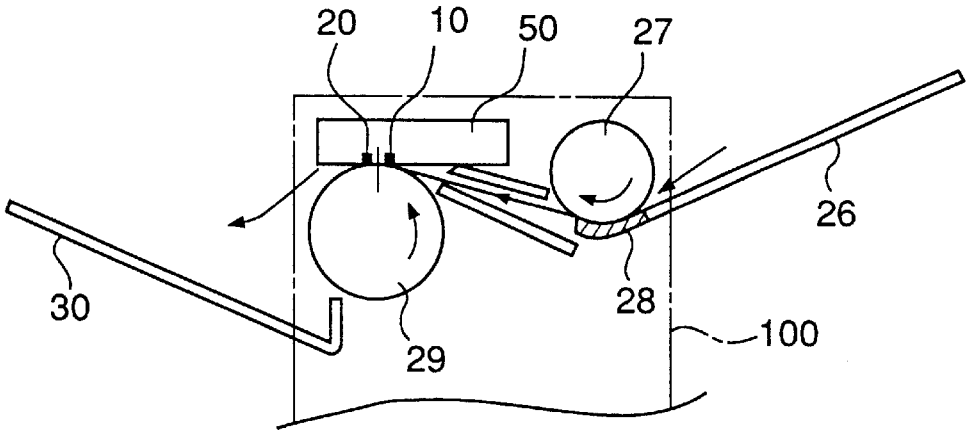
FIG. 22 is a diagram illustrating a structure of a facsimile machine having a thermal printer according to a fourth embodiment of the present invention.

FIG. 22 shows an example of a structure of a facsimile machine according to the fourth embodiment of the present invention. In FIG. 22, those parts which are the same as those shown in FIG. 9 are given the same reference numbers.

Referring to FIG. 22, the thermal head 10 and the image sensor 20 are mounted on the read/write unit 50 so as to be in contact with the feed roller 29 in the same manner as those shown in FIG. 9. The thermal head 10 is positioned at a position up stream side of the image sensor 20, in contrast with those shown in FIG. 9.

Figure 23:
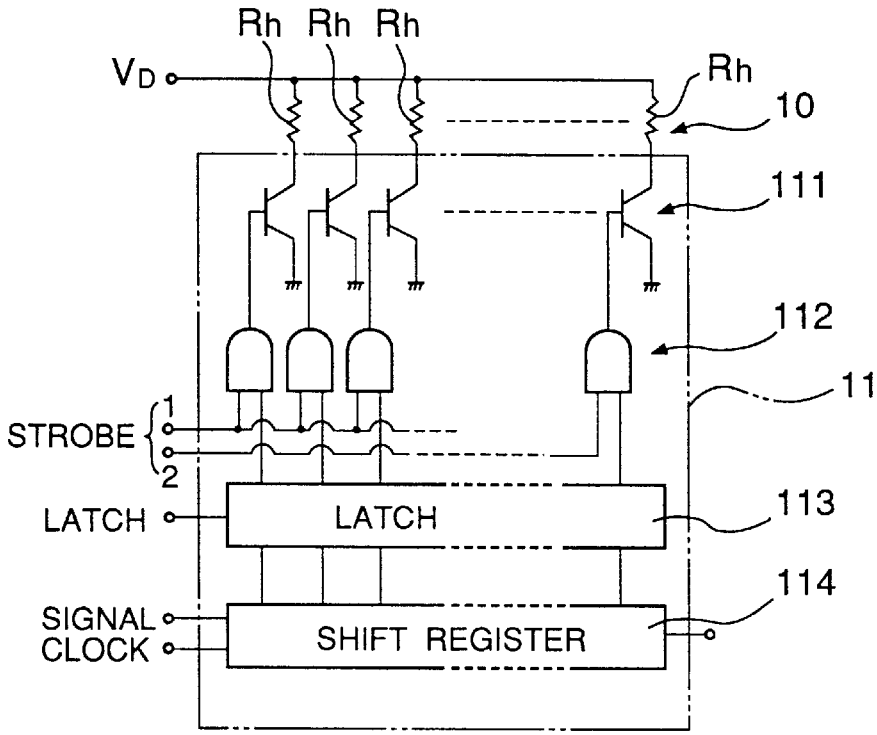
FIG. 23 is a circuit diagram illustrating a thermal head and a head driver.

The head driver 11 and the thermal head are formed as shown in FIG. 23. Referring to FIG. 23, the thermal head 10 has a plurality of heating resistors Rh. The head drier has the driving transistors 111, the AND gates 112, the latch circuit 113 and the shift register 114 in the same manner as that shown in FIG. 5. The AND gates 112 are grouped into two groups. A first strobe signal (1) is supplied to AND gates in a first group and a second strobe signal (2) is supplied to AND gates in a second group. Thus, the heater elements Rh of the thermal head 10 are driven in two parts.

Figures 24, 25:
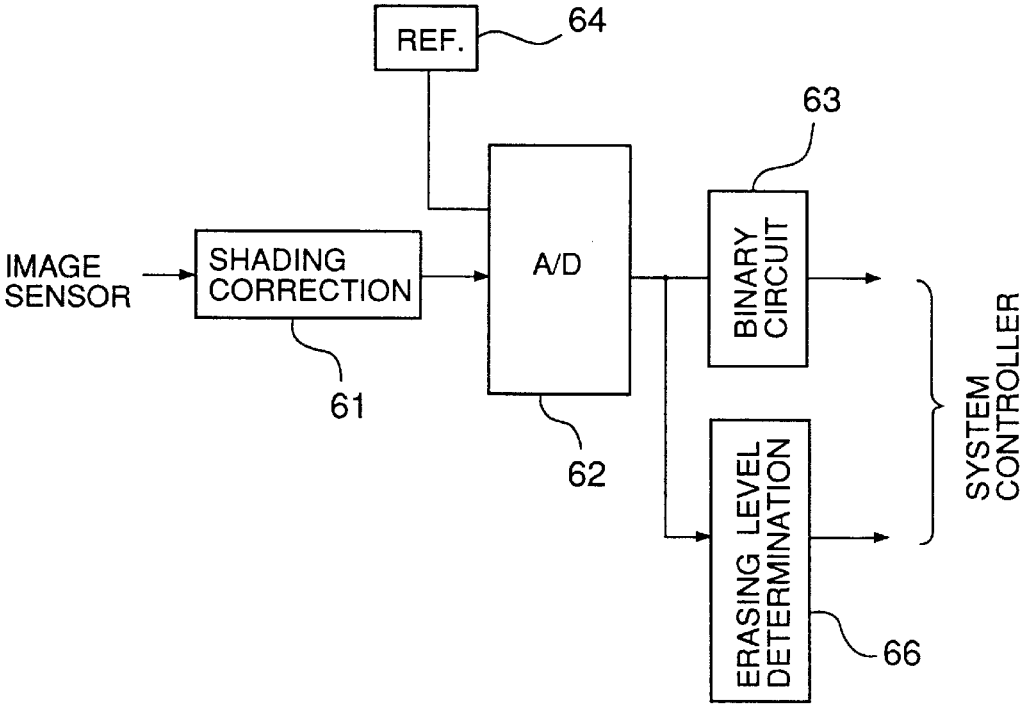
FIG. 24 is a block diagram illustrating an image processing unit.
FIG. 25 is a table indicating erasing and threshold level relationships used for determining the erasing levels.
Figure 26:
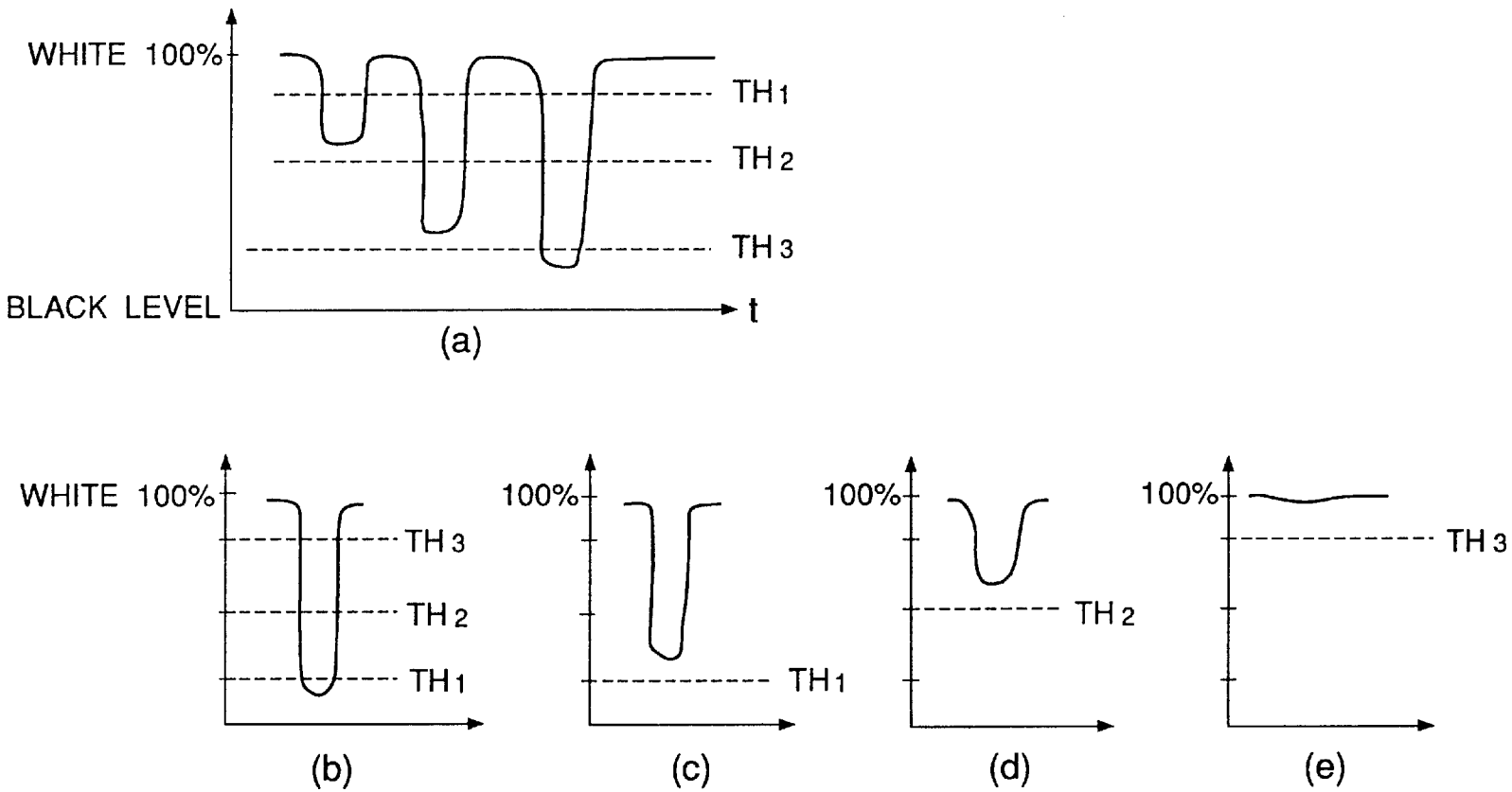
FIG. 26 is a diagram illustrating erasing levels.

The image processing unit 50 is formed as shown in FIG. 24. The image processing unit 50 has the shading correction circuit 61, the analog to digital converter 62, the binary circuit 63 and the reference generator 64 in the same manner as that shown in FIG. 19. The image processing unit 50 also has an erasing level determination circuit 66. The erasing level determination circuit 66 determines a degree to which images are erased from the thermal recording sheet. The degree to which images are erased from the thermal recording sheet is referred to as an erasing level. In the erasing mode, the erasing level determination circuit 66 converts the image data output from the analog to digital converter 62 into three groups of binary data, first binary data, second binary data and third binary data, by using three threshold levels TH1, TH2 and TH3 shown in FIG. 26(a). The first threshold level TH1 is greater than a second threshold level TH2. The second threshold level TH2 is greater than the third threshold level TH3. The erasing level determination circuit 66 determines an erasing level based on the binary data obtained by using the threshold levels TH1, TH2, and TH3, as shown in FIG. 25. That is, when all the first, second and third binary data generated by using the first, second and third threshold levels TH1, TH2, and TH3 include data representing a black dot, the erasing level is determined to be a first level (I) shown in FIG. 26(b). When only the first and second binary data generated by using the first and second threshold levels TH1 and TH2 include data representing a black dot, the erasing level is determined to be a second level (II) shown in FIG. 26(c). When only the first binary data generated by using the first threshold level TH1 includes data representing a black dot, the erasing level is determined to be a third level (III) shown in FIG. 26(d). When neither the first, second nor third binary data include data representing a black dot, the erasing level is determined as a fourth level (IV) shown in FIG. 26(e). The first level (I) corresponds to the lowest degree to which images are erased from the thermal recording sheet. The fourth level (IV) corresponds to the highest degree to which images are erased from the thermal recording sheet.

Figure 27:
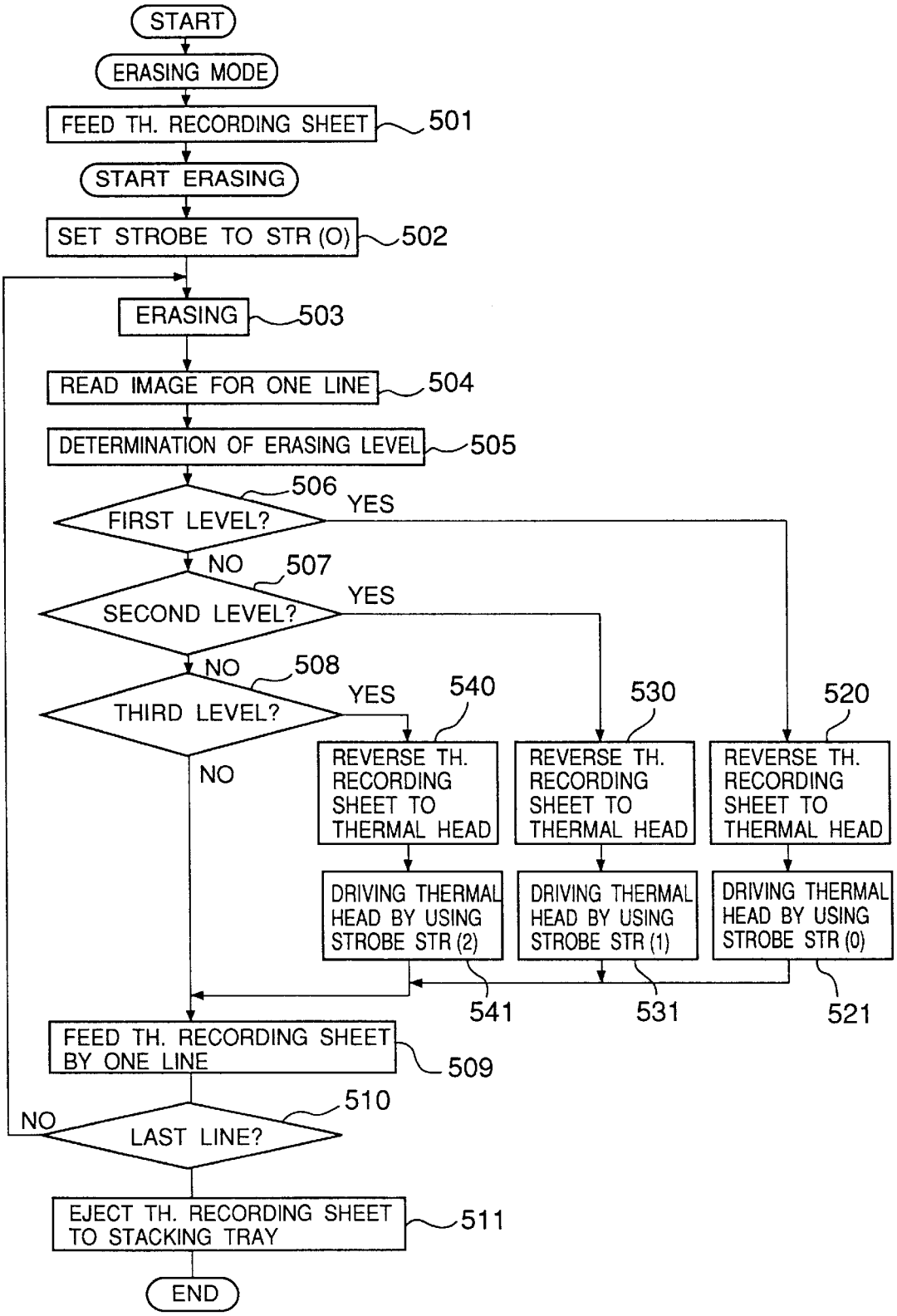
FIG. 27 is a flow chart illustrating a process in the erasing mode performed in the fourth embodiment.

In the erasing mode, a process for erasing an image from a thermal recording sheet is carried out in accordance with a flow chart shown in FIG. 27.

Referring to FIG. 27, the erasing mode is activated in accordance with an instruction input from the operation unit 19, and then step 501 controls the supplying roller 27 so that a thermal recording sheet on which an image has been recorded is fed from the sheet tray 26 to the read/write unit 50. After this, the thermal head 10 is controlled so that images on the thermal recording sheet are erased therefrom. Step 502 sets a pulse width of a strobe signal to a predetermined value STR(0). Step 503 erases images from the thermal recording sheet. That is, in step 503, the first and second strobe signals (1) and (2) each having the pulse width STR(0) and the erasing signal in which all bits are in the active state "1" are supplied from the system controller 18 to the head driver 11. Thus, thermal energy corresponding to the pulse width STR(0) of each of the first and second strobe signals is supplied to a line on the thermal recording sheet. After step 503, step 504 controls the motor 13 so that the thermal recording sheet is fed by one line. Then the line to which the thermal energy corresponding to the pulse width STR(0) is supplied is optically read by the image sensor 20.

Step 505 activates the erasing level determination circuit 66. Then step 506 determines whether or not the erasing level obtained by the erasing level determination circuit 66 is the first level (I). When step 506 determines that the erasing level is the first level (I) (see FIG. 26(b)), step 520 controls the motor 13 so that the thermal recording sheet is fed in a reverse direction by one line. As the result, the line to which the thermal energy has been supplied faces the thermal head 10 again. In this state, step 521 drives the thermal head 10 again so that the first and second strobe signal each having the pulse width STR(0) and the erasing signal are supplied to the head driver. Thus, the thermal energy corresponding to the pulse width STR(0) is supplied to the line on the thermal recording sheet again. After this, step 509 drives the motor 13 so that the thermal recording sheet is fed by one line.

When the result obtained in step 506 is NO and step 507 determines that the erasing level obtained by the erasing level determination circuit 66 is the second level (II) (see FIG. 26(c)), steps 530 and 531 are carried out. That is, the thermal recording sheet is fed in a referse direction by one line, and the thermal head 10 is driven by using the first and second strobe signals each having a pulse width STR(1). As a result, the thermal energy corresponding to the pulse width STR(1) is supplied again to the line which has been processed in step 503. The pulse width STR(1) is less than the pulse width STR(0), so that the thermal energy corresponding to the pulse width STR(1) is also less than that corresponding to the pulse width STR(0).

When the result obtained by step 507 is NO and step 508 determines that the erasing level obtained by the erasing level determination circuit 66 is the third level (III) (see FIG. 26(d)), steps 540 and 541 are carried out. That is, the thermal recording sheet is fed in the reverse direction one line and the thermal energy corresponding to the pulse width STR(2) of each of the first and second strobe signals is supplied to the line which has been processed in step 503. The pulse width STR(2) is less than the pulse width STR(1).

When the erasing level obtained by the erasing level detection circuit 66 is the fourth level, the result obtained in step 508 is NO. In this case, the image on a line has been completely erased from the thermal recording sheet, and the process proceeds directly to step 509.

After step 509, step 510 determines whether or not the last line has been processed. When the result obtained by step 510 is NO, the process returns to step 503 so that an image on the next line is erased. On the other hand, when step 510 determines that the last line has been processed, step 511 drives the motor 13 so that the thermal recording sheet ejected to the stacking tray 30.

Figure 28:
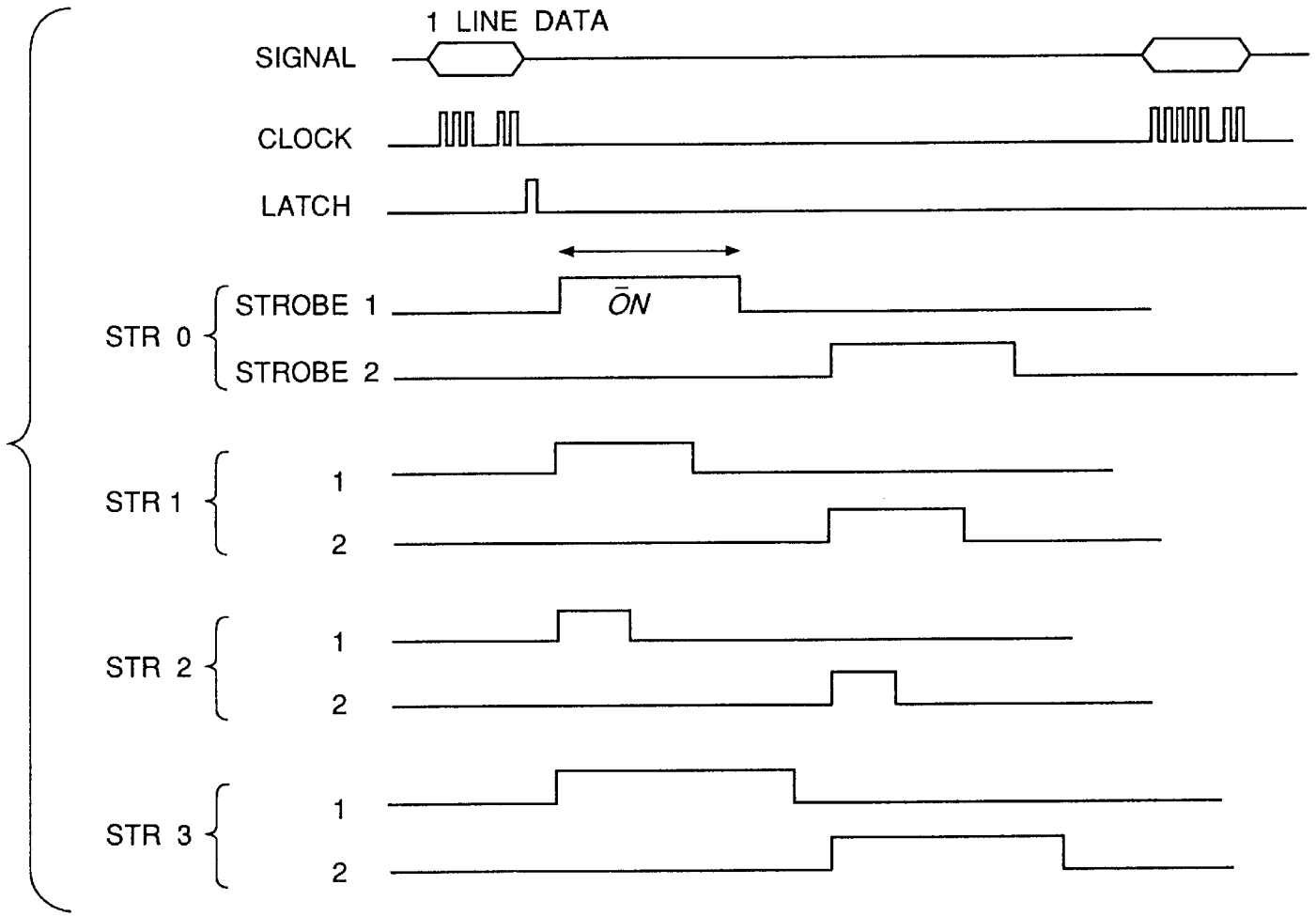
FIG. 28 is a timing chart illustrating first and second strobe signals.

In each of steps 521, 531 and 541, the first and second strobe signals are supplied to the head driver 11 at a timing as shown in FIG. 28.

In FIG. 28, the first and second strobe signals each having a pulse width STR(3) is shown. The pulse width STR(3) is greater than the pulse width STR(0). When the erasing level determination circuit 66 determines that images on a line have not been completely erased from the thermal recording sheet, the thermal energy corresponding to the pulse width STR(3) (the maximum pulse width) is supplied to the line on the thermal recording sheet.

In the fourth embodiment, after thermal energy is supplied to a line on the thermal recording sheet by the thermal head 10, a degree to which images are erased from the thermal recording sheet is determined in accordance with image data obtained by the image sensor. When the image on the line has not been completely erased from the thermal recording sheet, thermal energy is supplied again to the line. The amount of energy supplied again to the line is controlled in accordance with the degree to which the images have been erased. Thus, according to the fourth embodiment, images can be completely erased from the thermal recording sheet.

Figure 29:
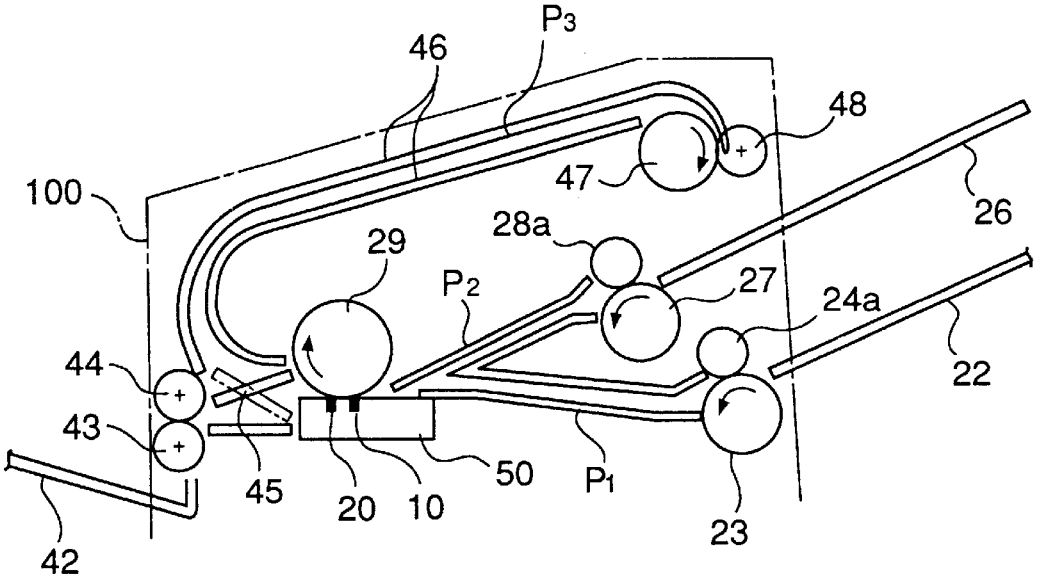
FIG. 29 is a diagram illustrating a structure of a facsimile machine having a thermal printer according to a modification of the fourth embodiment.

FIG. 29 shows a facsimile machine having a thermal printer according to a modification of the fourth embodiment. In FIG. 29, those parts which are the same as those shown in FIG. 15 are given the same reference numbers. In the facsimile machine shown in FIG. 15, after an image recorded on the thermal recording sheet is erased therefrom, the thermal recording sheet is automatically returned to the sheet tray 26 for stacking recording sheets.

In the facsimile machine showing FIG. 29, the thermal recording sheet having images formed thereon is fed from the document tray 22 to the read/write unit 50 via the first path P1. After the images are erased from the thermal recording sheet, the thermal recording sheet is fed via the third path P3 to the sheet tray 26.

In the above embodiments, a black dot image is formed on the milky white thermal recording sheet. However, if the thermal reversible material layer 2 of the thermal recording sheet is normally maintained in the transparent state, a milky dot image can be formed on a black thermal recording sheet. In this case, when thermal energy corresponding to the black temperature Tc shown in FIG. 2 is supplied to the black thermal recording sheet, the milky dot image is formed. When thermal energy corresponding to the temperature Tb shown in FIG. 2 is supplied to the black thermal recording sheet, the milky dot image is erased from the black thermal recording sheet.

The present invention is not limited to the aforementioned embodiments, and variations and modifications may be made without departing from the scope of the claimed invention.

What is claimed is:

1. A reading and writing system, comprising:

a thermal recording sheet on which information is to be recorded by heating said thermal recording sheet to a first temperature and information is to be erased therefrom by heating said thermal recording sheet to a second temperature, said thermal recording sheet having crystals made of organic low molecular weight particles which are dispersed in resin, the crystals changing in size in accordance with a temperature supplied thereto so that said thermal recording sheet is changed between a transparent state and a non-transparent state, the transparent state and the non-transparent state each being respectively maintained when said thermal recording sheet is at a normal temperature;

a reading system including:

a first tray; and an image sensor for optically reading a document supplied from the first tray; and a recording system for recording and erasing information on said thermal recording sheet, including:

a thermal head for heating said thermal recording sheet in a pattern;

a supplying roller for supplying said thermal recording sheet to said thermal head;

an ejecting roller for ejecting said thermal recording sheet out of said apparatus;

mode selecting means for selecting a recording mode or an erasing mode;

temperature detecting means for detecting a temperature of said thermal head;

storage means for storing a table indicating relationships between a temperature detected by said temperature detecting means and an amount of thermal energy to be supplied to said thermal recording sheet by using said thermal head in each of said recording mode and said erasing mode, the amounts of thermal energy being based on a first temperature to which said thermal recording sheet is to be heated in the recording mode and a second temperature to which said thermal recording sheet is to be heated in the erasing mode;

control means for controlling an amount of thermal energy supplied from said thermal head to said thermal recording sheet based on a mode selected by said mode selecting means and a temperature detected by said temperature detecting means with reference to said table so that said thermal recording sheet is heated to the first temperature in a pattern corresponding to information to be recorded in the recording mode and is heated to the second temperature in the erasing mode; and a second tray for holding said thermal recording sheet, wherein the supplying roller supplies said thermal recording sheet from the second tray to said thermal head.

2. A reading system as claimed in claim 1, wherein:

said thermal head has a plurality of heating elements each capable of being driven by a driving pulse signal;

said table stored in said storage means indicates a relationship between a temperature detected by said temperature detecting means and a pulse width of a driving pulse signal in each of the recording mode and the erasing mode, said pulse widths of the driving pulse signal being based on a first temperature to which said thermal recording sheet is to be heated in the recording mode and a second temperature to which said thermal recording sheet is to be heated in the erasing mode; and said control means has means for controlling the pulse width of a driving pulse signal supplied to said thermal head based on a mode selected by said mode selecting means and a temperature detected by said temperature detecting means with reference to said table.

3. A reading and writing system as claimed in claim 1, wherein:

said table stored in said storage means is indicative of a relationship between a temperature detected by said temperature detecting means and a pulse width of a driving pulse signal in each of the recording mode and the erasing mode, the pulse widths of the driving pulse signal being based on the first temperature to which said thermal recording sheet is to be heated in the recording mode and the second temperature to which said thermal recording sheet is to be heated in the erasing mode;

said control means has means for controlling the pulse width of a driving pulse signal supplied to said thermal head based on a mode selected by said mode selecting means and a temperature detected by said temperature detecting means with reference to said table; and said ejecting roller ejects said thermal recording sheet which has been erased to said second tray.

4. A system according to claim 1, wherein:

said control means controls said amount of thermal energy in the recording mode to record an image of a document on said thermal recording sheet.

5. A system according to claim 1, wherein:

said thermal head has a plurality of heating elements arranged in a line, said thermal head heating said thermal recording sheet so that a dotted pattern corresponding to the information to be recorded is formed on said thermal recording sheet line by line.

6. A system according to claim 5, wherein:

said control means operates in the erasing mode so that the thermal head erases by erasing a line above and a line below information which is to be erased.

7. A system according to claim 1, wherein:

said thermal recording sheet is made of paper.

8. A system according to claim 1, wherein:

said thermal recording sheet is made of plastic.

9. A system according to claim 1, wherein:

said thermal recording sheet is made of metal.

10. A system according to claim 1, wherein:

said thermal recording sheet includes a black base layer which is visible when said thermal recording sheet is in the transparent state and not visible when said thermal recording sheet is in the non-transparent state.

*11. A writing system, comprising:*

*a thermal recording sheet on which information is to be recorded by heating said thermal recording sheet to a first temperature and information is to be erased therefrom by heating said thermal recording sheet to a second temperature, said thermal recording sheet having crystals made of organic low molecular weight particles which are dispersed in resin, the crystals changing in size in accordance with a temperature supplied thereto so that said thermal recording sheet is changed between a transparent state and a non-transparent state, the transparent state and the non-transparent state each being respectively maintained when said thermal recording sheet is at a normal temperature;*

*a thermal head for heating said thermal recording sheet in a pattern;*

*a supplying roller for supplying said thermal recording sheet to said thermal head;*

*an ejecting roller for ejecting said thermal recording sheet out of said apparatus;*

*mode selecting means for selecting a recording mode or an erasing mode;*

*temperature detecting means for detecting a temperature of said thermal head;*

*storage means for storing a table indicating relationships between a temperature detected by said temperature detecting means and an amount of thermal energy to be supplied to said thermal recording sheet by using said thermal head in each of said recording mode and said erasing mode, the amounts of thermal energy being based on a first temperature to which said thermal recording sheet is to be heated in the recording mode and a second temperature to which said thermal recording sheet is to be heated in the erasing mode;*

*control means for controlling an amount of thermal energy supplied from said thermal head to said thermal recording sheet based on a mode selected by said mode selecting means and a temperature detected by said temperature detecting means with reference to said table so that said thermal recording sheet is heated to the first temperature in a pattern corresponding to information to be recorded in the recording mode and is heated to the second temperature in the erasing mode.*

*12. A reading and writing system, comprising:*

*a thermal recording sheet on which information is to be recorded by heating said thermal recording sheet to a first temperature and information is to be erased therefrom by heating said thermal recording sheet to a second temperature, said thermal recording sheet having crystals made of organic low molecular weight particles which are dispersed in resin, the crystals changing in size in accordance with a temperature supplied thereto so that said thermal recording sheet is changed between a transparent state and a non-transparent state, the transparent state and the non-transparent state each being respectively maintained when said thermal recording sheet is at a normal temperature;*

*a reading system including:*

*a sensor for reading information from the recording sheet; and*

*a recording system for recording and erasing information on said thermal recording sheet, including:*

*a thermal head for heating said thermal recording sheet in a pattern;*

*a supplying roller for supplying said thermal recording sheet to said thermal head;*

*an ejecting roller for ejecting said thermal recording sheet out of said apparatus;*

*mode selecting means for selecting a recording mode or an erasing mode;*

*temperature detecting means for detecting a temperature of said thermal head;*

*storage means for storing a table indicating relationships between a temperature detected by said temperature detecting means and an amount of thermal energy to be supplied to said thermal recording sheet by using said thermal head in each of said recording mode and said erasing mode, the amounts of thermal energy being based on a first temperature to which said thermal recording sheet is to be heated in the recording mode and a second temperature to which said thermal recording sheet is to be heated in the erasing mode;*

*control means for controlling an amount of thermal energy supplied from said thermal head to said thermal recording sheet based on a mode selected by said mode selecting means and a temperature detected by said temperature detecting means with reference to said table so that said thermal recording sheet is heated to the first temperature in a pattern corresponding to information to be recorded in the recording mode and is heated to the second temperature in the erasing mode; and*

*a holder of said thermal recording sheet,*

*wherein the suppling roller supplies said thermal recording sheet from the holder of said thermal recording sheet to said thermal head.*

*13. A reading and writing system, comprising:*

*a recordable material on which information is to be recorded by heating said recordable material to a first temperature and information is to be erased therefrom by heating said recordable material to a second temperature, said recordable material having crystals made of organic low molecular weight particles which are dispersed in resin, the crystals changing in size in accordance with a temperature supplied thereto so that said recordable material is changed between a transparent state and a non-transparent state, the transparent state and the non-transparent state each being respectively maintained when said recordable material is at a normal temperature;*

*a reading system including:*

*a sensor for reading information from the recordable material; and*

*a recording system for recording and erasing information on said recordable material, including:*

*a thermal head for heating said recordable material in a pattern;*

*a supplying roller for supplying said recordable material to said thermal head;*

*an ejecting roller for ejecting said recordable material out of said apparatus;*

*mode selecting means for selecting a recording mode or an erasing mode;*

*temperature detecting means for detecting a temperature of said thermal head;*

*storage means for storing a table indicating relationships between a temperature detected by said temperature detecting means and an amount of thermal energy to be supplied to said recordable material by using said thermal head in each of said recording mode and said erasing mode, the amounts of thermal energy being based on a first temperature to which said recordable material is to be heated in the recording mode and a second temperature to which said recordable material is to be heated in the erasing mode;*

*control means for controlling an amount of thermal energy supplied from said thermal head to said recordable material based on a mode selected by said mode selecting means and a temperature detected by said temperature detecting means with reference to said table so that said recordable material is heated to the first temperature in a pattern corresponding to infor-*

*mation to be recorded in the recording mode and is heated to the second temperature in the erasing mode; and*

*a holder of the said recordable material,*

*wherein the supplying roller supplies said recordable material from the holder to said thermal head.*

*14. A writing system, comprising:*

*a thermal recording sheet on which information is to be recorded by heating said thermal recording sheet to a first temperature and information is to be erased therefrom by heating said thermal recording sheet to a second temperature, said thermal recording sheet having crystals made of organic low molecular weight particles which are dispersed in resin, the crystals changing in size in accordance with a temperature supplied thereto so that said thermal recording sheet is changed between a transparent state and a non-transparent state, the transparent state and the non-transparent state each being respectively maintained when said thermal recording sheet is at a normal temperature;*

*a thermal head for heating said thermal recording sheet in a pattern;*

*a supplying roller for supplying said thermal recording sheet to said thermal head;*

*an ejecting roller for ejecting said thermal recording sheet out of said apparatus;*

*an operation unit for selecting a recording mode or an erasing mode;*

*a temperature sensor for detecting a temperature of said thermal head;*

*a memory for storing a table indicating relationships between a temperature detected by said temperature sensor and an amount of thermal energy to be supplied to said thermal recording sheet by using said thermal head in each of said recording mode and said erasing mode, the amounts of thermal energy being based on a first temperature to which said thermal recording sheet is to be heated in the recording mode and a second temperature to which said thermal recording sheet is to be heated in the erasing mode;*

*a controller for controlling an amount of thermal energy supplied from said thermal head to said thermal recording sheet based on a mode selected by said mode operation unit and a temperature detected by said temperature sensor with reference to said table so that said thermal recording sheet is heated to the first temperature in a pattern corresponding to information to be recorded in the recording mode and is heated to the second temperature in the erasing mode.*

*15. A reading and writing system, comprising:*

*a thermal recording sheet on which information is to be recorded by heating said thermal recording sheet to a first temperature and information is to be erased therefrom by heating said thermal recording sheet to a second temperature, said thermal recording sheet having crystals made of organic low molecular weight particles which are dispersed in resin, the crystals changing in size in accordance with a temperature supplied thereto so that said thermal recording sheet is changed between a transparent state and a non-transparent state, the transparent state and the non-transparent state each being respectively maintained when said thermal recording sheet is at a normal temperature;*

*a reading system including:*

*a sensor for reading information from the recording sheet; and*

*a recording system for recording and erasing information on said thermal recording sheet, including:*

*a thermal head for heating said thermal recording sheet in a pattern;*

*a supplying roller for supplying said thermal recording sheet to said thermal head;*

*an ejecting roller for ejecting said thermal recording sheet out of said apparatus;*

*an operation unit for selecting a recording mode or an erasing mode;*

*a temperature sensor for detecting a temperature of said thermal head;*

*a memory for storing a table indicating relationships between a temperature detected by said temperature sensor and an amount of thermal energy to be supplied to said thermal recording sheet by using said thermal head in each of said recording mode and said erasing mode, the amounts of thermal energy being based on a first temperature to which said thermal recording sheet is to be heated in the recording mode and a second temperature to which said thermal recording sheet is to be heated in the erasing mode;*

*a controller for controlling an amount of thermal energy supplied from said thermal head to said thermal recording sheet based on a mode selected by said operation unit and a temperature detected by said temperature sensor with reference to said table so that said thermal recording sheet is heated to the first temperature in a pattern corresponding to information to be recorded in the recording mode and is heated to the second temperature in the erasing mode; and*

*a holder of the said thermal recording sheet,*

*wherein the suppling roller supplies said thermal recording sheet from the holder of said thermal recording sheet to said thermal head.*

*16. A reading and writing system, comprising:*

*a recordable material on which information is to be recorded by heating said recordable material to a first temperature and information is to be erased therefrom by heating said recordable material to a second temperature, said recordable material having crystals made of organic low molecular weight particles which are dispersed in resin, the crystals changing in size in accordance with a temperature supplied thereto so that said recordable material is changed between a transparent state and a non-transparent state, the transparent state and the non-transparent state each being respectively maintained when said recordable material is at a normal temperature;*

*a reading system including:*

*a sensor for reading information from the recordable material; and*

*a recording system for recording and erasing information on said recordable material, including:*

*a thermal head for heating said recordable material in a pattern;*

*a supplying roller for supplying said recordable material to said thermal head;*

*an ejecting roller for ejecting said recordable material out of said apparatus;*

*an operation unit for selecting a record mode or an erasing mode;*

*a temperature sensor for detecting a temperature of said thermal head;*

*a memory for storing a table indicating relationships between a temperature detected by said temperature sensor and an amount of thermal energy to be supplied to said recordable material by using said thermal head in each of said recording mode and said erasing mode, the amounts of thermal energy being based on a first temperature to which said recordable material is to be heated in the recording mode and a second temperature to which said recordable material is to be heated in the erasing mode;*

*a controller for controlling an amount of thermal energy supplied from said thermal head to said recordable material based on a mode selected by said operation unit and a temperature detected by said temperature sensor with reference to said table so that said recordable material is heated to the first temperature in a pattern corresponding to information to be recorded in the recording mode and is heated to the second temperature in the erasing mode; and*

*a holder of the said recordable material,*

*wherein the supplying roller supplies said recordable material from the holder to said thermal head.*

*17. A writing method for writing with a thermal head on a thermal recording sheet on which information is to be recorded by heating said thermal recording sheet to a first temperature and information is to be erased therefrom by heating said thermal recording sheet to a second temperature, said thermal recording sheet having crystals made of organic low molecular weight particles which are dispersed in resin, the crystals changing in size in accordance with a temperature supplied thereto so that said thermal recording sheet is changed between a transparent state and a non-transparent state, the transparent state and the non-transparent state each being respectively maintained when said thermal recording sheet is at a normal temperature, the method comprising the steps of:*

*selecting a recording mode or an erasing mode;*

*detecting a temperature of said thermal head;*

*storing a table indicating relationships between a detected temperature and an amount of thermal energy to be supplied to said thermal recording sheet by using said thermal head in each of said recording mode and said erasing mode, the amounts of thermal energy being based on a first temperature to which said thermal recording sheet is to be heated in the recording mode and a second temperature to which said thermal recording sheet is to be heated in the erasing mode;*

*controlling an amount of thermal energy supplied from said thermal head to said thermal recording sheet based on a selected mode and a detected temperature with reference to said table so that said thermal recording sheet is heated to the first temperature in a pattern corresponding to information to be recorded in the recording mode and is heated to the second temperature in the erasing mode.*

*18. A method for reading and writing with a thermal head on a thermal recording sheet on which information is to be recorded by heating said thermal recording sheet to a first temperature and information is to be erased therefrom by heating said thermal recording sheet to a second temperature, said thermal recording sheet having crystals made of organic low molecular weight particles which are dispersed in resin, the crystals changing in size in accordance with a temperature supplied thereto so that said thermal recording sheet is changed between a transparent state and a non-transparent state, the transparent state and the non-transparent state each being respectively maintained when said thermal recording sheet is at a normal temperature, the method comprising the steps of:*

*supplying the thermal recording sheet to said thermal head;*

*selecting a recording mode or an erasing mode;*

*detecting a temperature of said thermal head;*

*storing a table indicating relationships between a detected temperature and an amount of thermal energy to be supplied to said thermal recording sheet by using said thermal head in each of said recording mode and said erasing mode, the amounts of thermal energy being based on a first temperature to which said thermal recording sheet is to be heated in the recording mode and a second temperature to which said thermal recording sheet is to be heated in the erasing mode;*

*controlling an amount of thermal energy supplied from said thermal head to said thermal recording sheet based on a selected mode and a detected temperature with reference to said table so that said thermal recording sheet is heated to the first temperature in a pattern corresponding to information to be recorded in the recording mode and is heated to the second temperature in the erasing mode; and*

*wherein the suppling step supplies said thermal recording sheet from a holder of said thermal recording sheet to said thermal head.*

*19. A method for reading and writing with a thermal head on a recordable material on which information is to be recorded by heating said recordable material to a first temperature and information is to be erased therefrom by heating said recordable material to a second temperature, said recordable material having crystals made of organic low molecular weight particles which are dispersed in resin, the crystals changing in size in accordance with a temperature supplied thereto so that said recordable material is changed between a transparent state and a non-transparent state, the transparent state and the non-transparent state each being respectively maintained when said recordable material is at a normal temperature, the method comprising the steps of:*

*supplying said recordable material to said thermal head;*

*selecting a record mode or an erasing mode;*

*detecting a temperature of said thermal head;*

*storing a table indicating relationships between a detected temperature and an amount of thermal energy to be supplied to said recordable material by using said thermal head in each of said recording mode and said erasing mode, the amounts of thermal energy being based on a first temperature to which said recordable material is to be heated in the recording mode and a second temperature to which said recordable material is to be heated in the erasing mode;*

*controlling an amount of thermal energy supplied from said thermal head to said recordable material based on a selected mode and a detected temperature with reference to said table so that said recordable material is heated to the first temperature in a pattern corresponding to information to be recorded in the recording mode and is heated to the second temperature in the erasing mode; and*

*wherein the supplying step supplies said recordable material from a holder to said thermal head.*

* * * * *